(12) United States Patent
Suetsugu et al.

(10) Patent No.: US 10,972,879 B2
(45) Date of Patent: *Apr. 6, 2021

(54) COMMUNICATION TERMINAL, COMMUNICATION METHOD, COMPUTER READABLE RECORDING MEDIUM HAVING COMMUNICATION PROGRAM RECORDED, AND NETWORK SYSTEM

(71) Applicant: Sharp Kabushiki Kaisha, Sakai (JP)

(72) Inventors: Junji Suetsugu, Sakai (JP); Tatsuya Sakai, Sakai (JP); Toshio Akabane, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/693,543

(22) Filed: Nov. 25, 2019

(65) Prior Publication Data

US 2020/0100073 A1   Mar. 26, 2020

Related U.S. Application Data

(63) Continuation of application No. 16/140,972, filed on Sep. 25, 2018, now Pat. No. 10,524,097, which is a (Continued)

(30) Foreign Application Priority Data

Oct. 5, 2009   (JP) .................................. 2009-231158

(51) Int. Cl.
*H04W 4/20*   (2018.01)
*H04W 4/12*   (2009.01)
(Continued)

(52) U.S. Cl.
CPC ............... *H04W 4/12* (2013.01); *H04L 51/04* (2013.01); *H04L 65/4015* (2013.01);
(Continued)

(58) Field of Classification Search
CPC .......... H04L 61/2061; H04L 61/6022; H04W 8/005; H04W 4/14; H04W 64/00; H04W 52/02; G06F 3/01; G06F 3/0605
See application file for complete search history.

(56) References Cited

U.S. PATENT DOCUMENTS

2004/0139052 A1*   7/2004   Kazushige .............. H04L 29/06

OTHER PUBLICATIONS

Suetsugu et al., "Communication Terminal, Communication Method, Computer Readable Recording Medium Having Communication Program Recorded, and Network System", U.S. Appl. No. 16/140,972, filed Sep. 25, 2018.

* cited by examiner

*Primary Examiner* — Phuoc H Doan
(74) *Attorney, Agent, or Firm* — Keating & Bennett, LLP

(57) ABSTRACT

A communication terminal includes: a display, an input device for accepting a first operation instruction; a communication device for connection with a server and another terminal; and a control unit for receiving first contents from the server via the communication device according to the first operation instruction, determining whether connection with another terminal is established or not, transmitting the first contents to another terminal via the communication device when a determination is made that connection with another terminal is established, and causing the display to show the first contents.

8 Claims, 17 Drawing Sheets

Related U.S. Application Data continuation of application No. 15/678,236, filed on Aug. 16, 2017, now Pat. No. 10,117,071, which is a continuation of application No. 15/272,525, filed on Sep. 22, 2016, now Pat. No. 9,775,010, which is a continuation of application No. 14/547,987, filed on Nov. 19, 2014, now Pat. No. 9,485,349, which is a continuation of application No. 13/500,232, filed as application No. PCT/JP2010/067446 on Oct. 5, 2010, now Pat. No. 8,909,263.

(51) Int. Cl.
*H04L 29/06* (2006.01)
*H04M 1/72436* (2021.01)
*H04L 29/08* (2006.01)
*H04L 12/58* (2006.01)
*H04M 7/00* (2006.01)

(52) U.S. Cl.
CPC .... *H04L 67/2814* (2013.01); *H04M 1/72436* (2021.01); *H05K 999/99* (2013.01); *G06F 2213/0038* (2013.01); *H04M 7/0027* (2013.01); *H04M 2201/38* (2013.01); *H04M 2207/18* (2013.01)

FIG.8

| PTEXT (DATA · CODE RELATED TO TEXT OF PAGE (DISPLAY DATA)) | | |
|---|---|---|
| CONSTANT · VARIABLE DESIGNATION | MEANING | EXAMPLES OF CONSTANT VALUE · VARIABLE VALUE |
| SPOS | OBJECT (PAGE TEXT) DISPLAY START POSITION | (0,5) |
| | | ↓ (DATA · CODE RELATED TO FONT SIZE, TEXT COLOR, AND THE LIKE) |
| DATAT | OBJECT (PAGE TEXT) CONTENTS | COMPATIBILITY TEST<br>PRESS TEST BUTTON, AND NAME ENTRY BOX WILL APPEAR. BY OPERATING "TEST" BUTTON UPON HANDWRITING BOTH NAMES, THE COMPATIBILITY BETWEEN THE TWO WILL BE TESTED |

| PIMG (DATA · CODE RELATED TO IMAGE OF PAGE (DISPLAY DATA)) | | |
|---|---|---|
| CONSTANT · VARIABLE DESIGNATION | MEANING | EXAMPLES OF CONSTANT VALUE · VARIABLE VALUE |
| SPOS | OBJECT (PAGE IMAGE) DISPLAY START POSITION | (20,180) |
| | | ↓ (DATA · CODE RELATED TO IMAGE DATA SIZE AND THE LIKE) |
| DATAI | NAME OF FILE IN WHICH OBJECT (PAGE IMAGE) IS STORED | B_IMG.JPG 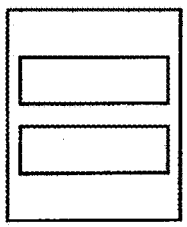 |

| PBTN (DATA · CODE RELATED TO BUTTON (SERVICE USAGE START BUTTON) OF PAGE (DISPLAY DATA)) | | | |
|---|---|---|---|
| CONSTANT · VARIABLE DESIGNATION | | MEANING | EXAMPLES OF CONSTANT VALUE · VARIABLE VALUE |
| SPOS | | OBJECT (SERVICE USAGE START BUTTON) DISPLAY START POSITION | (140,300) |
| | | | ↓ (DATA · CODE RELATED TO BUTTON TYPE · BUTTON DISPLAY DESIGNATION (EX: TEST) AND THE LIKE) |
| DATAB | | DATA · CODE RELATED TO BUTTON (SERVICE USAGE START BUTTON) OBJECT OPERATION | |
| | DLDT | FILE NAME OF DOWNLOAD (UNDERLYING) IMAGE DURING SERVICE USAGE | B_IMG.JPG 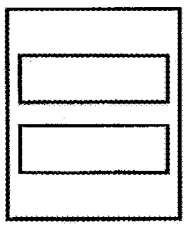 |
| | ULADR | ADDRESS (MAIL ADDRESS) TO WHICH GENERATED DATA (POST DATA) IS TO BE TRANSMITTED | (REFER: SERVICE USAGE START FLOW) |
| | | | ↓ (DATA · CODE RELATED TO DESIGNATION AND THE LIKE OF POST BUTTON) |
| | PBPUSH() | PROGRAM CODE WHEN BUTTON (SERVICE USAGE START BUTTON) IS DEPRESSED | (REFER: SERVICE USAGE START FLOW) |

COMMUNICATION TERMINAL, COMMUNICATION METHOD, COMPUTER READABLE RECORDING MEDIUM HAVING COMMUNICATION PROGRAM RECORDED, AND NETWORK SYSTEM

CROSS REFERENCE TO RELATED APPLICATIONS

This application is a Continuation of copending U.S. application Ser. No. 13/500,232 filed on Apr. 4, 2012, which is the National Phase of PCT International Application No. PCT/JP2010/067446 filed on Oct. 5, 2010, which claims the benefit under 35 U.S.C. § 119(a) to Japanese Patent Application No. 2009-231158, filed in Japan on Oct. 5, 2009, all of which are hereby expressly incorporated by reference into the present application.

TECHNICAL FIELD

The present invention relates to a communication terminal capable of connection with a server and another terminal, a computer readable recording medium having a communication program recorded, a communication method, and a network system. Particularly, the present invention relates to a communication terminal that can transmit contents received from a server to another terminal, a computer readable recording medium having a communication program recorded, a communication method, and a network system.

BACKGROUND ART

There is known a communication terminal receiving entry of a handwriting image from a user through a touch panel. Some of these communication terminals allow the transmission and reception of a handwriting image with another terminal, i.e. the so-called handwriting chat.

For example, Japanese Patent Laying-Open No. 2004-221842 (PTL 1) discloses a communication system and a terminal device thereof. According to Japanese Patent Laying-Open No. 2004-221842 (PTL 1), a session control means carries out voice conversation, as well as image and handwriting data communication without requiring permission from the reception side. An image/handwriting data management means includes a plurality of planes, displays the basic image data at one of these planes, and displays handwriting data currently in communication at another plane for overlapping display of these plurality of planes. An image data transmission control means/reception control means transfers and receives the basic image data with the expedient designation and/or data contents switched. A display control means arranges the coordinate system of the basic image data with the handwriting data to exchange the position indicating the handwriting data between the terminal devices, allowing scrolling and display such that the basic image data and handwriting data are displayed at the display means.

Japanese Patent Laying-Open No. 2004-234594 (PTL 2) discloses a photo communication system and method as well as an information recording medium. According to Japanese Patent Laying-Open No. 2004-234594 (PTL 2), a pair of information communication terminals including image input means for receiving image data from a memory card or the like of a digital camera, data recording means for recording image data and the like, input means for entry of a designation from a user, image display means for displaying a recorded image or the like, data communication means for transferring data such as recorded image with another terminal, and control means for controlling execution of the terminal are configured to allow, upon writing handwritten graphic elements through input means overlaid on image display means while the image displayed at the image display means is viewed at each of the information communication terminals, the handwritten result including an image to be displayed at the information communication terminal of the other party in real time.

Furthermore, Japanese Patent Laying-Open No. 2008-108027 (PTL 3) discloses an image posting management system and an image posting management method. According to Japanese Patent Laying-Open No. 2008-108027 (PTL 3), there is provided an image posting management method based on a server allowing communication via a communication network or the Internet, a system manager terminal device, a group manager terminal device, and a user terminal device. The user enters an ID/password for verification in the server. A permitted user is allowed viewing an image with respect to the users in the group. A candidate for membership is designated to belong to any of the groups based on a permission from the system manager, allowing posting, viewing, and printing of an image in that group.

CITATION LIST

Patent Literature

PTL 1: Japanese Patent Laying-Open No. 2004-221842
PTL 2: Japanese Patent Laying-Open No. 2004-234594
PTL 3: Japanese Patent Laying-Open No. 2008-108027

SUMMARY OF INVENTION

Technical Problem

The conventional art set forth above is disadvantageous in that, during a handwriting chat with another terminal, a background image (underlying image) for the handwriting chat could not be obtained from the server and that the relevant background image could not be shared with another terminal.

In view of such problems, an object of the present invention is to obtain, during a handwriting chat with another terminal, a background image for the handwriting chat from a server, and to share the relevant background image with another terminal.

Solution to Problem

According to an aspect of the present invention, a communication terminal capable of communication with a server and another terminal is provided. The communication terminal includes a display, an input device for accepting a first operation instruction, a communication device for connection with the server and another terminal, and a control unit which receives first contents from the server via the communication device according to the first operation instruction, determines whether connection with another terminal is established or not, and transmits the first contents to another terminal via the communication device when a determination is made that connection with another terminal is established, and causes the display to show the first contents.

Preferably, the input device accepts a second operation instruction for drawing second contents. The control unit causes the display to show the first and second contents in an overlapped manner based on the second operation instruction, and transmits the second operation instruction or second contents to another terminal via the communication device.

Preferably, the input device includes a tablet for accepting input of a handwriting image as the second contents. The tablet is disposed at the surface of the display. The first contents is a background image for showing the entry box of a handwriting image.

According to another aspect of the present invention, there is provided a communication method of a communication terminal including a display, a control unit, and a communication device. The communication method includes the steps of accepting a first operation instruction by the control unit, receiving first contents from a server via the communication device according to the first operation instruction by the control unit, determining whether connection with another terminal is established or not by the control unit, transmitting the first contents to another terminal via the communication device when a determination is made that connection with another terminal is established by the control unit, and causing the display to show the first contents by the control unit.

According to a further aspect of the present invention, there is provided a computer readable recording medium having a communication program recorded for communication of a communication terminal including a display, a control unit, and a communication device. The communication program causes the control unit to execute the steps of accepting a first operation instruction, receiving first contents from a server via the communication device according to the first operation instruction, determining whether connection with another terminal is established or not, transmitting the first contents to another terminal via the communication device when a determination is made that connection with another terminal is established, and causing display to show the first contents.

According to another aspect of the present invention, there is provided a network system including a server, a first terminal, and a second terminal. The server transmits first contents to the first terminal according to a request from the first terminal. The first terminal includes a first display, a first input device for accepting a first operation instruction, a first communication device for connection with the server and the second terminal, and a first control unit for receiving the first contents from the server via the first communication device according to the first operation instruction determining whether connection with the second terminal is established or not, transmitting the first contents to the second terminal via the first communication device when a determination is made that connection with the second terminal is established, and causing the first display to show the first contents. The second terminal includes a second display, a second communication device for connection with the first terminal, and a second control unit for receiving the first contents from the first terminal via the second communication device, and causing the second display to show the first contents.

According to another aspect of the present invention, there is provided a communication method of a network system including a server, a first terminal, and a second terminal. The communication method includes the steps of accepting a first operation instruction by the first terminal, requesting the server of first contents via a first communication device according to a first operation instruction by the first terminal, transmitting by the server the first contents to the first terminal according to the request from the first terminal, determining whether connection with the second terminal is established or not by the first terminal, transmitting the first contents to the second terminal via the first communication device when a determination is made that connection with the second terminal is established by the first terminal, causing the first display to show the first contents by the first terminal, receiving the first contents from the first terminal via a second communication device by the second terminal, and causing a second display to show the first contents by the second terminal.

Advantageous Effects of Invention

According to the present invention, a background image for a handwriting chat can be obtained from a server, and the background image can be shared with another terminal, during a handwriting chat with another terminal.

BRIEF DESCRIPTION OF DRAWINGS

FIG. 8 is a pictorial representation of a data structure of a service page according to an embodiment.

DESCRIPTION OF EMBODIMENTS

Figure 1:
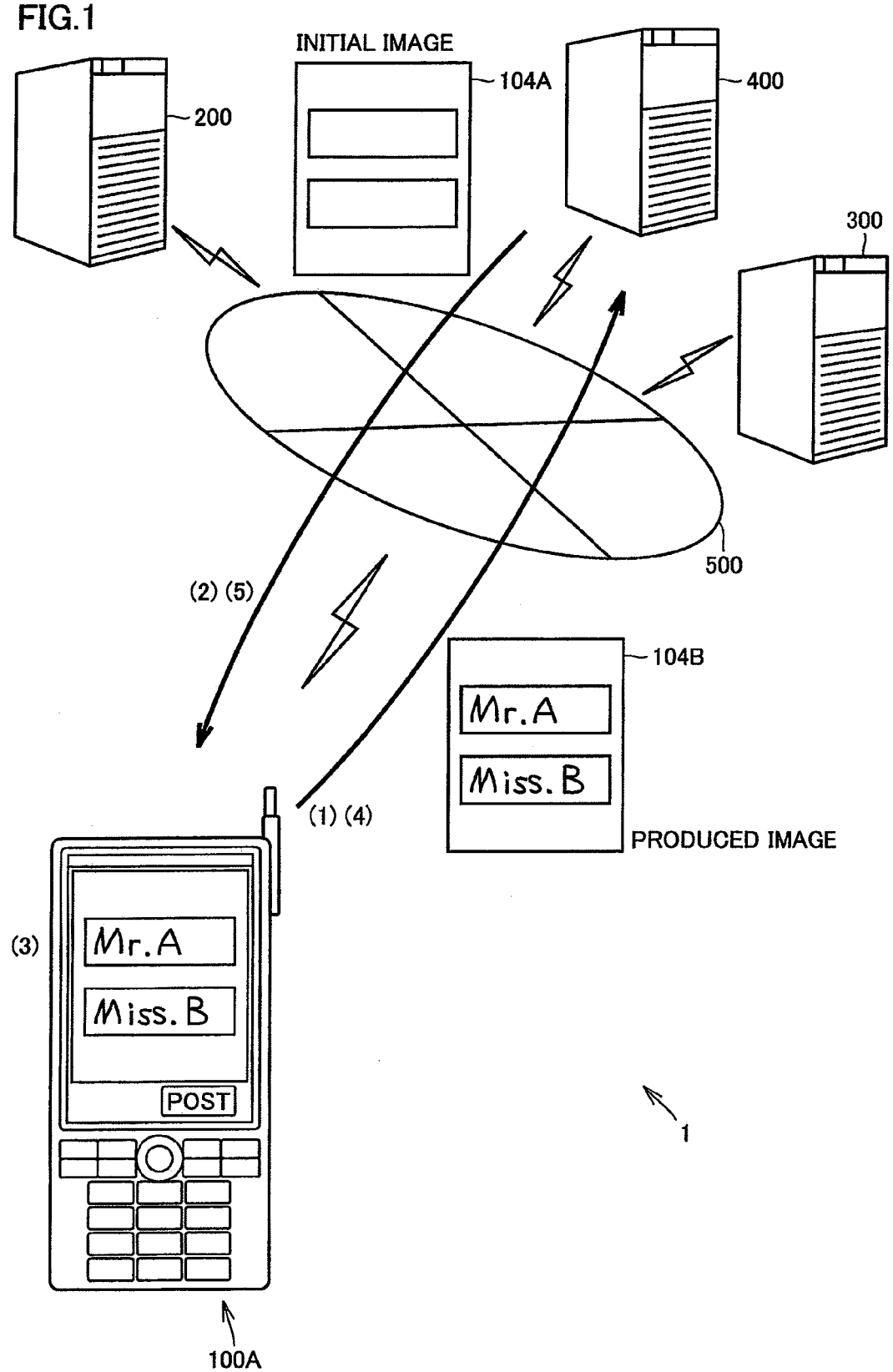
FIG. 1 is a pictorial representation of an operation overview in a non-chat mode of a network system according to an embodiment.

Embodiments of the present invention will be described hereinafter with reference to the drawings. In the following, the same elements have the same reference characters allotted. Their designation and feature are also the same. Therefore, detailed description thereof will not be repeated.

<Overall Configuration of Network System 1>

Figure 2:
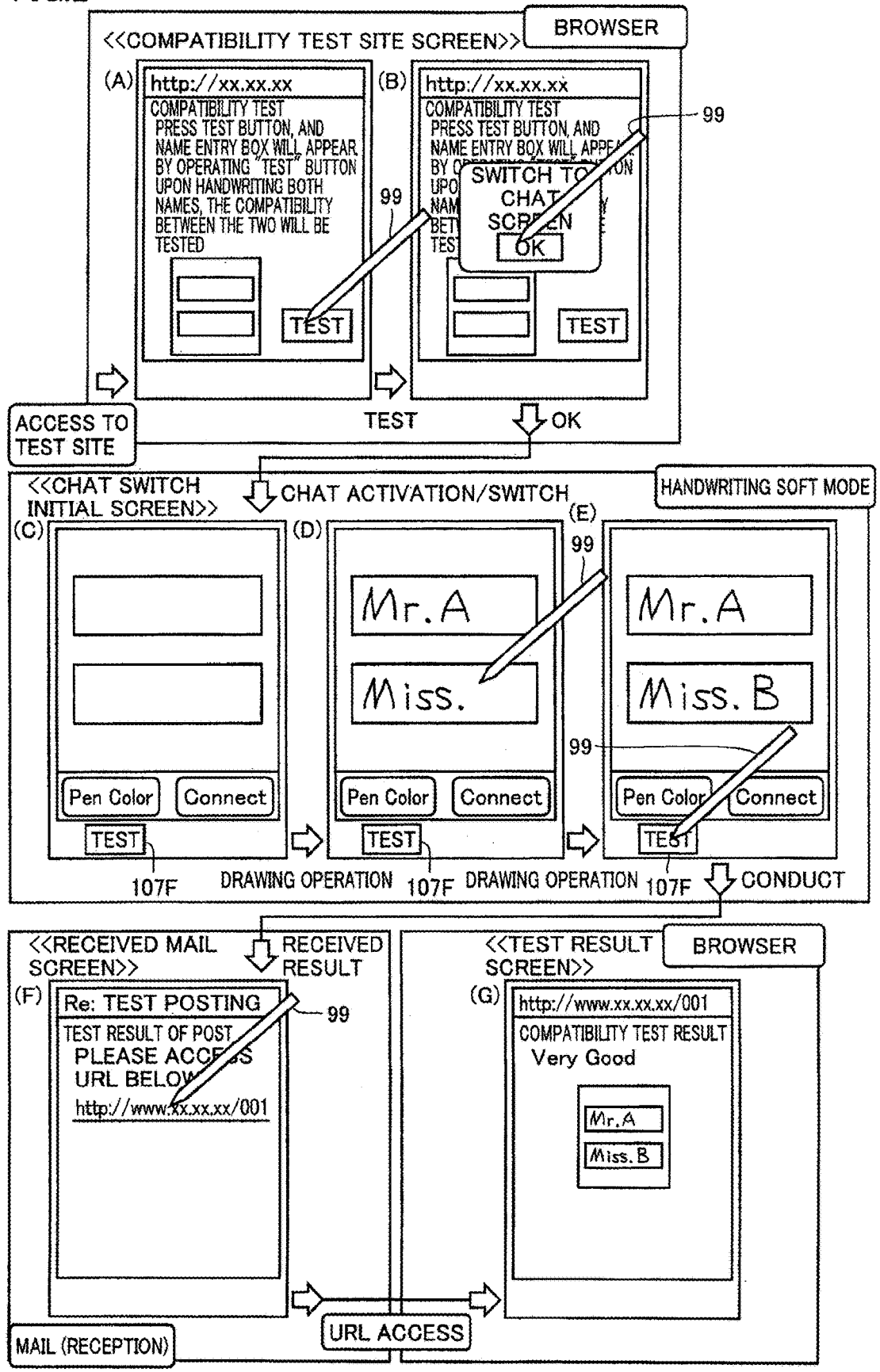
FIG. 2 is a pictorial representation of screen transition of a cellular phone in a non-chat mode according to an embodiment.
Figure 3:
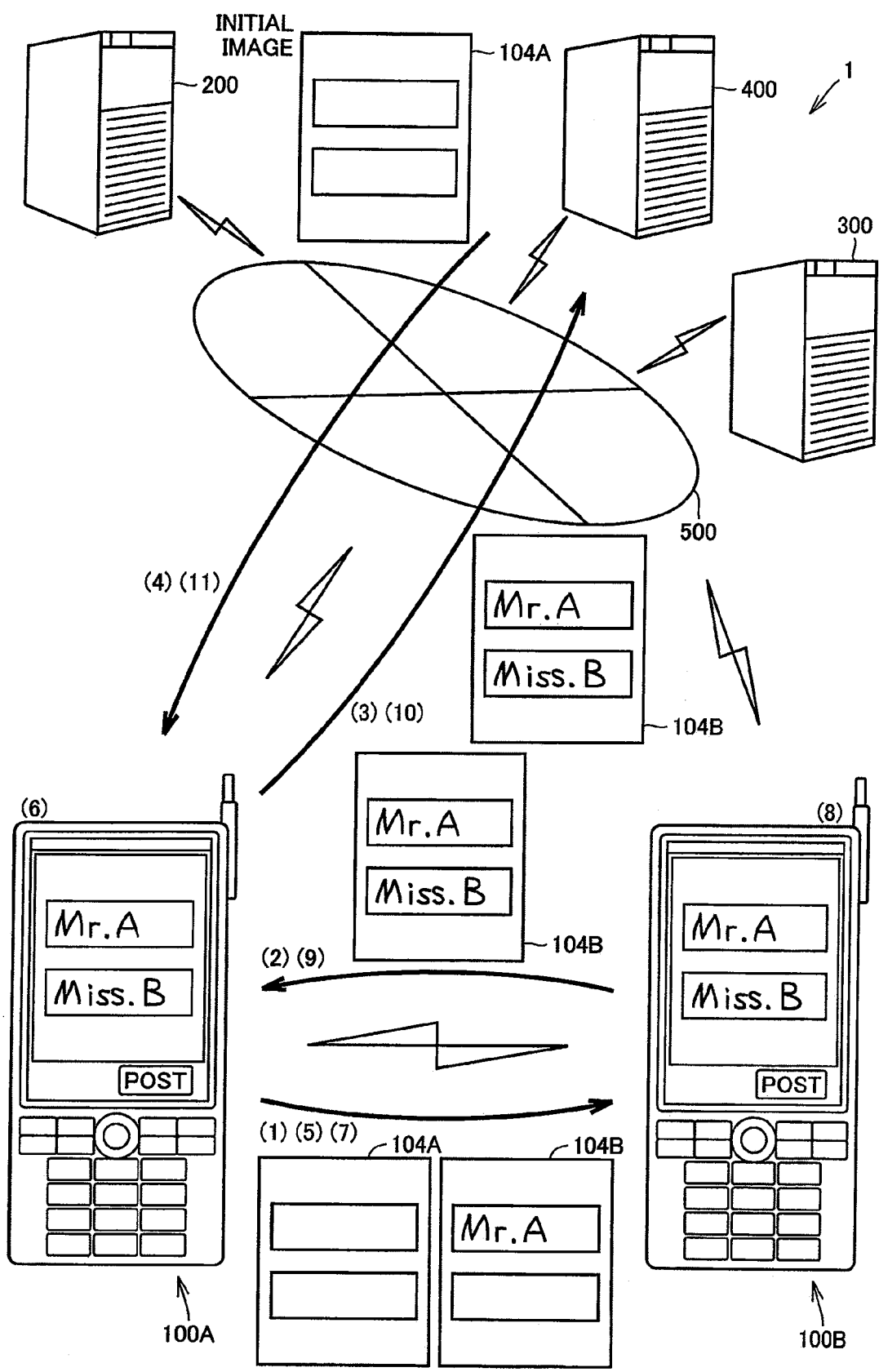
FIG. 3 is a pictorial representation of an operation overview in a chat mode of the network system according to an embodiment.
Figure 4:
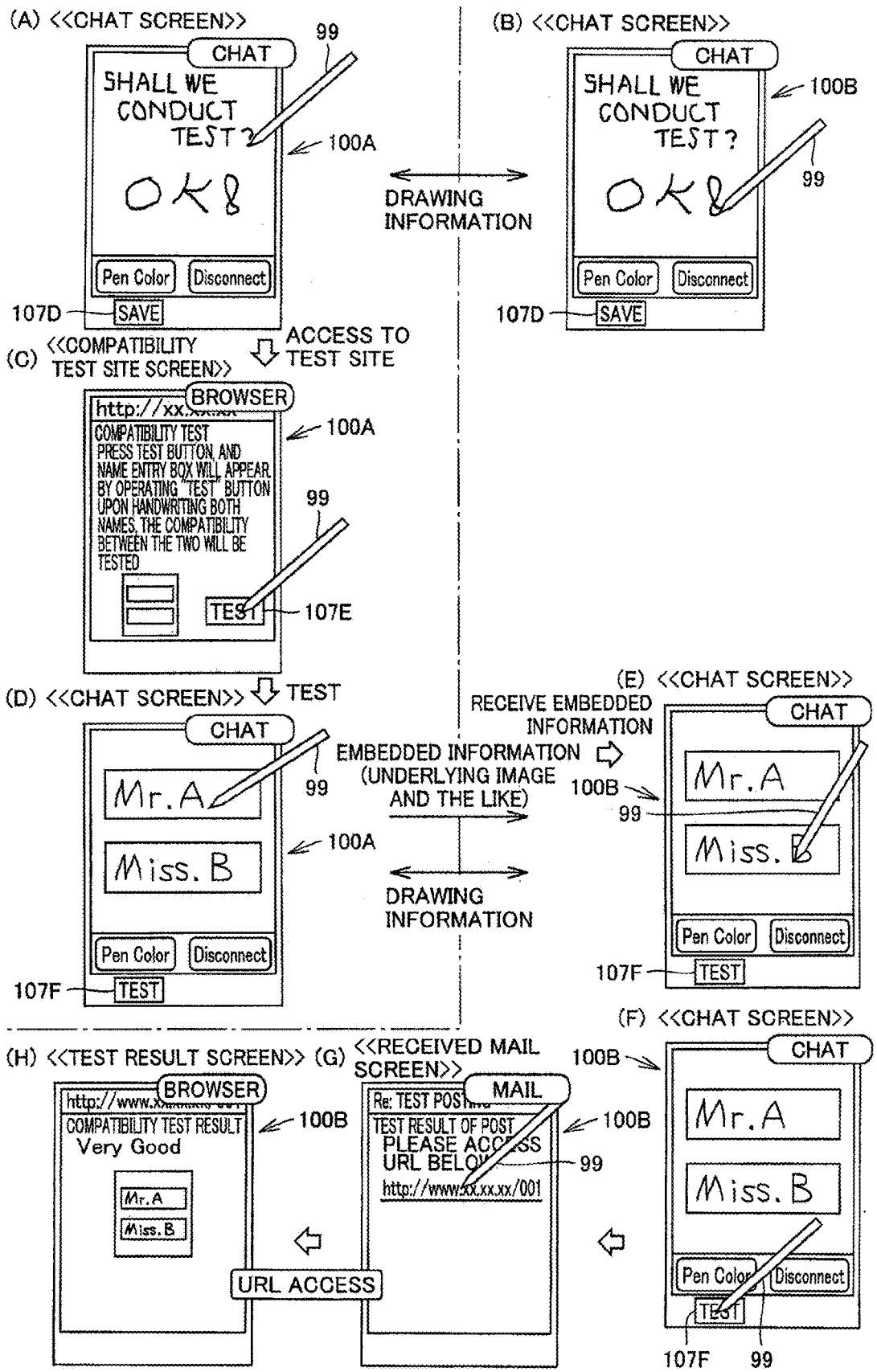
FIG. 4 is a pictorial representation of screen transition of a cellular phone in a chat mode according to an embodiment.

First, a network system 1 according to an embodiment will be described. FIG. 1 is a pictorial representation of an operation overview in a non-chat mode of network system 1 according to the present embodiment. FIG. 2 is a pictorial representation of screen transition of a cellular phone 100 in a non-chat mode according to the present embodiment. FIG. 3 is a pictorial representation of an operation overview in a chat mode of network system 1 according to the present embodiment. FIG. 4 is a pictorial representation of screen transition of cellular phone 100 in a chat mode according to the present embodiment.

Referring to FIGS. 1 and 3, network system 1 of the present embodiment includes a plurality of cellular phones 100A, and 100B, a mail server 200, a chat server 300, a posting server 400, and a network 500. The plurality of cellular phones 100A and 100B are also generically referred to as cellular phone 100 hereinafter.

Each of cellular phones 100A and 100B, mail server 200, chat server 300 and posting serving 400 can be connected on a network 500 such as a LAN (Local Area Network), WAN (Wide Area Network), the Internet, a carrier network or the like. In other words, cellular phones 100A and 100B, mail server 200, chat server 300 and posting serving 400 can be connected with each other via network 500.

More specifically, cellular phones 100A and 100B, mail server 200, chat server 300 and posting serving 400 are assigned identification information (for example, mail address, IP (Internet Protocol) address or the like) to identify itself. A plurality of cellular phones 100A and 100B store the identification information of another communication apparatus in its internal recording medium. Accordingly, each of the plurality of cellular phones 100A and 100B can transmit and receive data to/from another communication apparatus via network 500 based on the identification information of another communication apparatus.

When each of the plurality of cellular phones 100A and 100B gains access to network 500 in the present embodiment, it is assumed that an IP address is assigned to the relevant communication terminal by a server not shown. First cellular phone 100A according to the present embodiment can carry out data transmission and reception to/from second cellular phone 100B without intervention of a server if the IP address assigned to itself and the IP address assigned to second cellular phone 100B are obtained.

Thus, first cellular phone 100A and second cellular phone 100B of the present embodiment constitute the so-called P2P (Peer to Peer) type network by obtaining the IP address of each other. Since the details of an IP address assigning process is well known, description thereof will not be repeated here.

<Operation Overview of Network System 1>

An operation overview of network system 1 according to the present embodiment will be described hereinafter. Particularly, an operation overview (FIGS. 1 and 2) corresponding to the case where first cellular phone 100A and second cellular phone 100B are not currently engaged in a handwriting chat (non-chat mode), and an operation overview (FIGS. 3 and 4) corresponding to the case where first cellular phone 100A and second cellular phone 100B are currently engaged in a handwriting chat (chat mode) will be described hereinafter.

Referring to FIGS. 1 and 2, an operation overview corresponding to the case where first cellular phone 100A and second cellular phone 100B are not currently engaged in a handwriting chat will be described hereinafter.

(1) The user of first cellular phone 100A logs into posting server 400. For example, as shown in FIG. 2(A), first cellular phone 100A downloads from posting server 400 a Web page of a compatibility test site, and provides a display of the Web page. As shown in FIG. 2(B), in response to the user selecting a background image or entering a switching instruction to a chat screen, first cellular phone 100A requests posting server 400 of handwriting chat information (hereinafter, also referred to as "function embedded information" or "posting service related information") including an initial image 104A according to the instruction from the user.

(2) Posting server 400 transmits the handwriting chat information to first cellular phone 100A. The handwriting chat information includes a background image of a handwriting chat (initial screen) and other information used in the handwriting chat. As shown in FIG. 2(C), first cellular phone 100A receives the handwriting chat information and displays the initial screen.

(3) As shown in FIG. 2(D), first cellular phone 100A accepts a handwriting instruction from the user. First cellular phone 100A accepts a handwritten instruction of an image or text from the user through a stylus pen or touch panel to provide a display of the relevant image and/or text (handwriting image). For example, first cellular phone 100A accepts the name of a man, the name of a woman, and the like as handwriting image.

(4) As shown in FIG. 2(E), first cellular phone 100A transmits a handwriting image 104B to posting server 400. Posting server 400 executes a predetermined process (calculation) based on handwriting image 104B from first cellular phone 100A. For example, posting server 400 identifies a man's name and woman's name from the handwriting image and refers to a database to conduct a test on the compatibility therebetween.

(5) Posting server 400 transmits the processed result to first cellular phone 100A. First cellular phone 100A shows the processed result. For example, posting server 400 extracts the compatibility result, performs a calculation or the like, and transmits the obtained result to first cellular phone 100A. The result of the compatibility test is displayed at first cellular phone 100A.

More specifically, as shown in FIG. 2(F) in the present embodiment, posting server 400 utilizes a mail server 200 to transmit the address of the site to view the processed result to first cellular phone 100A through electronic mail. As shown in FIG. 2(G), first cellular phone 100A downloads a Web page indicating the processed result from posting server 400 based on the received address.

An operation overview corresponding to the case where first cellular phone 100A is currently engaged in a handwriting chat with second cellular phone 100B will be described with reference to FIGS. 3 and 4.

(1) First cellular phone 100A and second cellular phone 100B perform P2P communication based on each other's IP address. As shown in FIG. 4(A), first cellular phone 100A transmits a handwriting image "Shall we conduct test?" to second cellular phone 100B.

(2) As shown in FIG. 4(B), second cellular phone 100B transmits a handwriting image "OK!" to first cellular phone 100A. At this stage, the handwriting images displayed at first cellular phone 100A and second cellular phone 100B are preferably the same, as shown in FIGS. 4(A) and (B) in FIG. 4.

(3) The user of first cellular phone 100A proceeds to utilize a test service. Specifically, the user of first cellular phone 100A logs into posting server 400. For example, as shown in FIG. 4(C), first cellular phone 100A downloads a Web page of a compatibility test site from posting server 400, and displays the relevant Web page. Upon the user selecting a background image and/or entering a switching instruction to the chat screen, first cellular phone 100A requests posting server 400 of handwriting chat information (initial image 104A) according to the instruction from the user.

(4) Posting server 400 transmits the handwriting chat information to first cellular phone 100A. The handwriting chat information includes a background image (initial screen) of the handwriting chat and other information used in the handwriting chat. First cellular phone 100A receives the handwriting chat information and displays the initial screen.

(5) First cellular phone 100A transmits the initial screen to second cellular phone 100B. Accordingly, first cellular phone 100A and second cellular phone 100B can produce a handwriting image based on the same initial screen.

(6) As shown in FIG. 4(D), first cellular phone 100A accepts a handwriting instruction from the user. First cellular phone 100A accepts a drawing instruction of an image and/or text from the user through a stylus pen or touch panel, and displays the relevant image and/or text (handwriting image). For example, first cellular phone 100A accepts a man's name and the like as a handwriting image.

(7) First cellular phone 100A transmits handwriting image 104B to second cellular phone 100B. As shown in FIG. 4(E), second cellular phone 100B receives handwriting image 104B and displays the same.

(8) Second cellular phone 100B accepts a handwriting instruction from the user. Second cellular phone 100B accepts a drawing instruction of an image and/or text from the user through a stylus pen or touch panel, and displays the relevant image and/or text (handwriting image). For example, second cellular phone 100B accepts a woman's name as a handwriting image.

(9) Second cellular phone 100B transmits a handwriting image 104B to first cellular phone 100A. First cellular phone 100A receives handwriting image 104B and displays handwriting image 104A.

(10) As shown in FIG. 4(F), first cellular phone 100A (or second cellular phone 100B) transmits handwriting image 104B to posting server 400. Posting server 400 executes a predetermined process (calculation) based on handwriting image 104B from first cellular phone 100A. For example, posting server 400 identifies the man's name or woman's name from the handwriting image to conduct a compatibility test therebetween by referring to a database.

(11) Posting server 400 transmits the processed result to first cellular phone 100A (or second cellular phone 100B). First cellular phone 100A (or second cellular phone 100B) displays the processed result.

For example, posting server 400 extracts the compatibility result, performs a calculation or the like, and transmits the obtained result to first cellular phone 100A (or second cellular phone 100B). At this stage, first cellular phone 100A (or second cellular phone 100B) displays the result of the compatibility test.

In the present embodiment, first cellular phone 100A (or second cellular phone 100B) transmits the processed result to second cellular phone 100B (or first cellular phone 100A). Second cellular phone 100B (or first cellular phone 100A) receives the processed result for display.

More specifically, as shown in FIG. 4(G) in the present embodiment, posting server 400 utilizes mail server 200 to transmit the address of the site to view the processed result to first cellular phone 100A (or second cellular phone 100B). First cellular phone 100A (or second cellular phone 100B) transfers the electronic mail to second cellular phone 100B (or first cellular phone 100A).

As shown in FIG. 4(H) first cellular phone 100A and second cellular phone 100B download a Web page showing the processed result from posting server 400 based on the relevant address. First cellular phone 100A and second cellular phone 100B provide a display of the Web page indicating the processed result.

According to network system 1 of the present embodiment, first cellular phone 100A can obtain a background image for a handwriting chat according to a service from posting server 400. When first cellular phone 100A and second cellular phone 100B are currently engaged in a handwriting chat, first cellular phone 100A can share the background image received from posting server 400 with second cellular phone 100B.

A configuration to realize such a feature will be described in detail hereinafter.

<Hardware Configuration of Cellular Phone 100>

Figure 5:
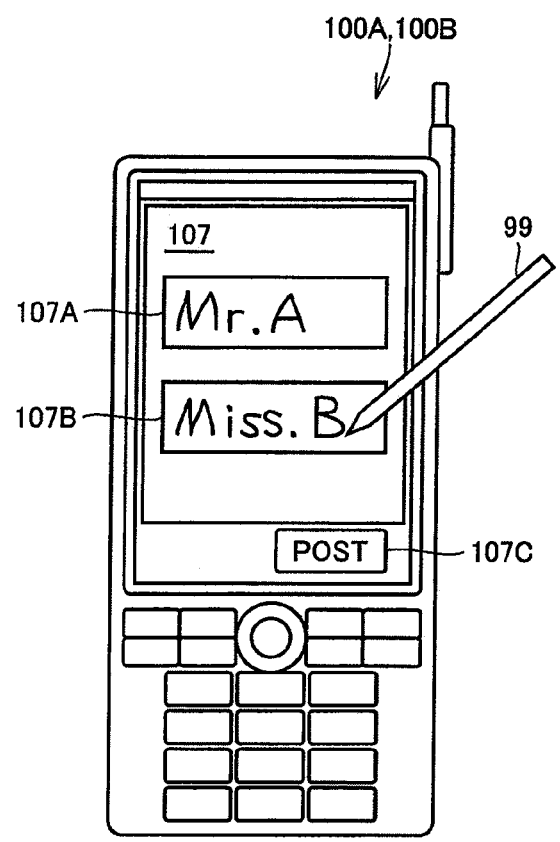
FIG. 5 is a pictorial representation of an outer appearance of a cellular phone according to an embodiment.
Figure 6:
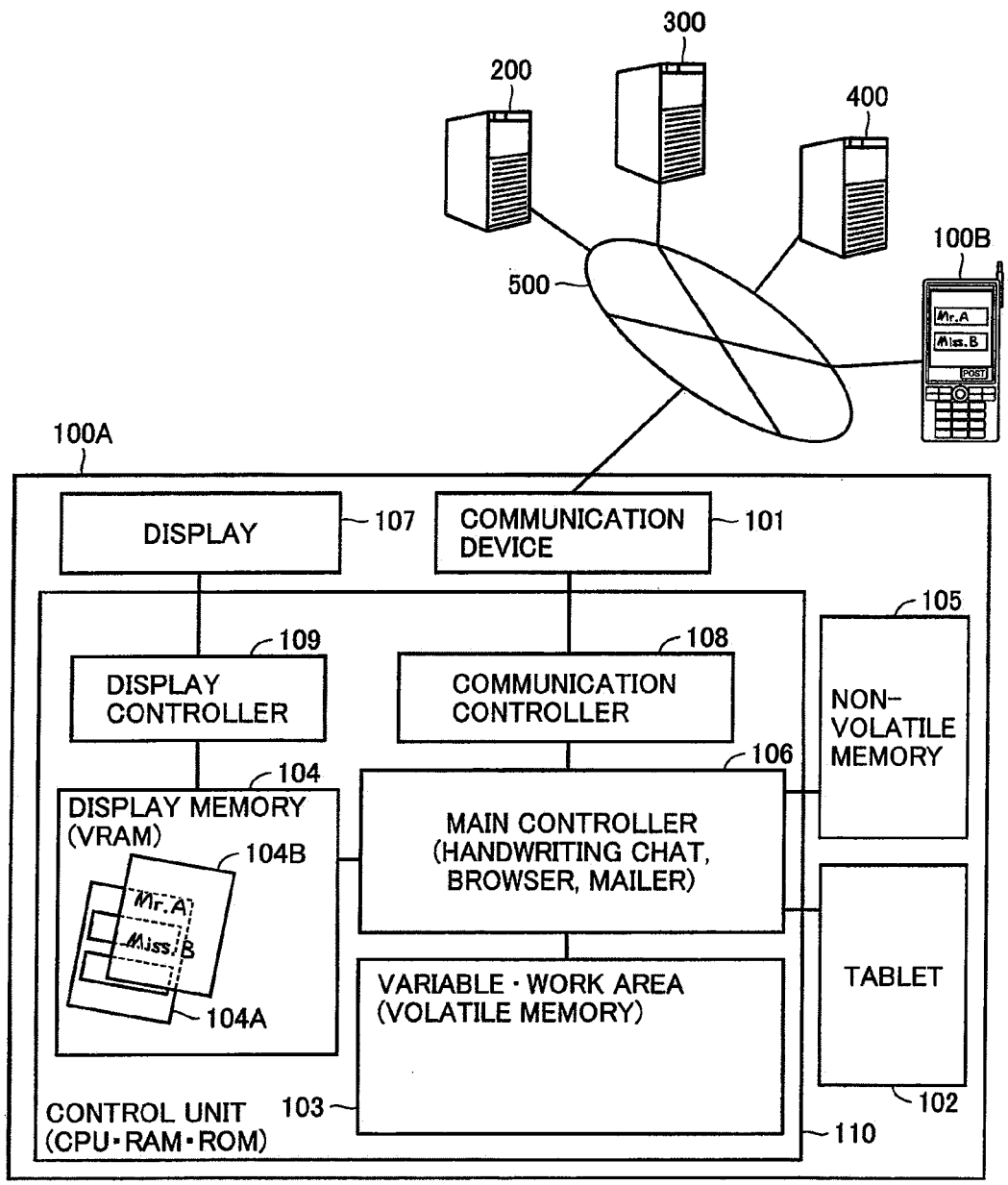
FIG. 6 is a block diagram of a hardware configuration of a cellular phone according to an embodiment.

A hardware configuration of cellular phone 100 according to the present embodiment will be described hereinafter. FIG. 5 is a pictorial representation of an outer appearance of a cellular phone 100 according to the present embodiment. FIG. 6 is a block diagram of a hardware configuration of cellular phone 100 according to the present embodiment.

As shown in FIGS. 5 and 6, cellular phone 100 according to the present embodiment includes a communication device 101 (i.e., a wireless communication device) for transmitting and receiving data to/from an external communication terminal via a network, a tablet 102 accepting an instruction from the user, a non-volatile memory 105 for storing a program and various data in a non-volatile manner, a display 107, and a control unit 110 for controlling each component in cellular phone 100.

Communication device 101 converts communication data from control unit 110 into a communication signal, and emits the communication signal via an antenna. Communication device 101 converts the communication signal received via an antenna into communication data, which is input to control unit 110.

Control unit 110 controls each component in cellular phone 100. Control unit 110 includes a CPU (Central Processing Unit), a microprocessor (Microprocessor), FPGA (Field Programmable Gate Array), ASIC (Application Specific Integrated Circuit), DSP (Digital Signal Processor), and a circuit having other operational functions, and the like. Control unit 110 also includes a RAM (Random Access Memory), ROM (Read Only Memory), VRAM (Video RAM), and the like.

Control unit 110 includes a volatile memory 103 implemented by a RAM or the like, and a display memory 104 implemented by a VRAM. Control unit 110 includes a main controller 106 implemented by a CPU or the like, a communication controller 108, and a display controller 109.

Volatile memory 103 functions as a work memory. Volatile memory 103 is implemented by, for example, a RAM (Random Access Memory), SRAM (Static Random Access Memory), DRAM (Dynamic Random Access Memory), SDRAM (Synchronous DRAM), DDR-SDRAM (Double Data Rate SDRAM), RDRAM (Rambus Dynamic Random Access Memory (registered trademark)), Direct-RDRAM (Direct Rambus Dynamic Random Access Memory (registered trademark)), a circuit having a configuration capable of storing data in a volatile manner, or the like.

More specifically, main controller 106 reads out from volatile memory 103 a control program such as of a handwriting chat, browser, mailer, and the like to execute the relevant control program. Control unit 110 accepts various instructions from the user through tablet 102. Control unit 110 transfers data with another terminal, mail server 200, chat server 300, posting server 400 and the like via communication device 101 and network 500.

For example, control unit 110 responds to a user's instruction accepted via tablet 102 to request posting server 400 of a background image via communication device 101. Control unit 110 displays an underlying image (first contents) received from posting server 400 via communication device 101 for display at display 107.

Control unit 110 accepts a drawing instruction via tablet 102. Control unit 110 transmits an accepted handwriting image (second contents) to another terminal through communication device 101. Control unit 110 receives a handwriting image from another terminal via communication device 101. Control unit 110 displays the received handwriting image at display 107.

Control unit 110 transmits a handwriting image drawn at cellular phone 100 or another terminal to posting server 400 via communication device 101. Control unit 110 displays the processed result received from posting server 400 at display 107.

Non-volatile memory 105 according to the present embodiment is realized by, for example, a flash memory, ROM (Read Only Memory), mask ROM, PROM (Programmable Read Only Memory), EPROM (Erasable Programmable ROM), EEPROM (Electrically Erasable PROM), FeRAM (Ferroelectric Random Access Memory), a circuit having a configuration capable of storing data in a non-volatile manner, and the like.

Display 107 of the present embodiment is constituted of a liquid crystal panel or CRT (Cathode Ray Tube). Display 107 displays contents such as an image and/or text based on a signal (instruction) from control unit 110. Namely, control unit 110 causes display 107 to show the background image and handwriting image in a superimposed manner At the communication terminal of the present embodiment, tablet 102 is provided at the lower side (back side) of display 107. Accordingly, the user can use a stylus pen, a finger, or the like to enter graphical information and the like in a handwriting manner to control unit 110 through tablet 102. In other words, display 107 and tablet 102 of the present embodiment constitute the so-called touch panel.

<Hardware Configuration of Posting Server 400>

Figure 7:
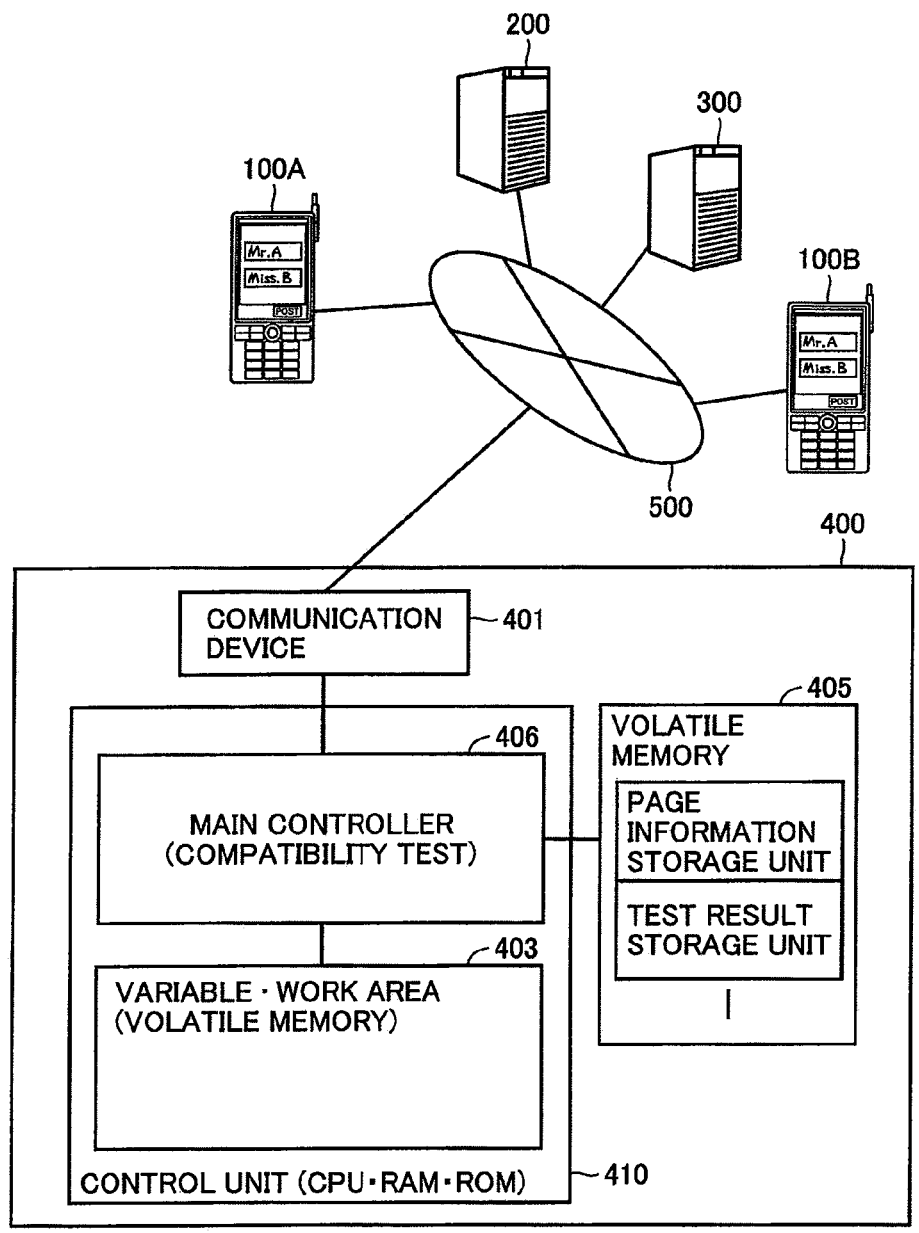
FIG. 7 is a block diagram of a hardware configuration of a posting server 400 according to an embodiment.

A hardware configuration of posting server 400 of the present embodiment will be described hereinafter. FIG. 7 is a block diagram of a hardware configuration of posting server 400 according to the present embodiment. The hardware configuration of mail server 200 and chat server 300 are basically similar to that of posting server 400. Therefore, description thereof will not be repeated.

Referring to FIG. 7, posting server 400 of the present embodiment includes a communication device 401 (i.e., a wireless communication device) transmitting and receiving data to/from an external communication terminal via a network, a non-volatile memory 405 storing a program and various data in a non-volatile manner, and a control unit 410 for controlling each component in posting server 400.

Communication device 401 converts the communication data from control unit 410 into a communication signal, which is dispatched onto network 500. Communication device 401 converts the communication signal received via network 500 into communication data, which is input to control unit 410.

Control unit 110 controls each component in posting server 400. Control unit 410 includes a CPU (Central Processing Unit), microprocessor, FPGA (Field Programmable Gate Array), ASIC (Application Specific Integrated Circuit), DSP (Digital Signal Processor), and a circuit having other operation features, and the like. Control unit 110 includes a RAM (Random Access Memory), ROM (Read Only Memory), VRAM (Video RAM), and the like.

Control unit 410 includes a volatile memory 403 implemented by a RAM or the like. Control unit 410 also includes a main controller 406 implemented by a CPU or the like.

Volatile memory 403 functions as a work memory. Volatile memory 403 is implemented by, for example, RAM (Random Access Memory), SRAM (Static Random Access Memory), DRAM (Dynamic Random Access Memory), SDRAM (Synchronous DRAM), DDR-SDRAM (Double Data Rate SDRAM), RDRAM (Rambus Dynamic Random Access Memory registered trademark)), Direct-RDRAM (Direct Rambus Dynamic Random Access Memory (registered trademark)), a circuit having a configuration capable of storing data in a volatile manner, and the like.

More specifically, main controller 406 reads out a control program from volatile memory 403 to execute the relevant control program. Control unit 410 transfers data with cellular phone 100, mail server 200, chat server 300, and the like via communication device 401 and network 500.

For example, control unit 410 responds to a request received from cellular phone 100 via communication device 401 to transmit an underlying image to cellular phone 100 via communication device 401. Control unit 410 receives a handwriting image drawn at cellular phone 100 via communication device 401. Control unit 410 executes a predetermined process (calculation) based on the handwriting image. Control unit 410 transmits the processed result to cellular phone 100 via communication device 401.

Non-volatile memory 405 of the present embodiment is implemented by, for example, flash memory, ROM (Read Only Memory), mask ROM or PROM (Programmable Read Only Memory), EPROM (Erasable Programmable ROM), EEPROM (Electrically Erasable PROM), FeRAM (Ferroelectric Random Access Memory), a circuit having a configuration capable of storing data in a non-volatile manner, and the like.

<Data Structure>

Data of a service page transmitted from posting server 400 to cellular phone 100 will be described hereinafter. FIG. 8 is a pictorial representation of the data structure of a service page according to the present embodiment.

Referring to FIG. 8, non-volatile memory 405 in posting server 400 stores text data (PTEXT) for a service introduction page, image data (PIMG) of the service introduction page, and button data (PBTN) for the service usage page.

The text data (PTEXT) of the service introduction page includes a display start position (SPOS) of an object, and the contents of the object (DATAT).

The image data (PIMG) of the service introduction page includes a display start position (SPOS) of an object, and a file name (DATAI) of the file in which the object is stored.

Button data (PBTN) of a service usage page includes a display start position (SPOS) of an object, and a data code (DATAB) related to an operation on the object. Data code (DATAB) related to an operation on an object includes an underlying image file name (DLDT) in a service usage mode, an address (ULADR) to which the generated image data is to be transmitted, and a program code (PBPUSH ( )) in a button depressed mode. The underlying image file name (DLDT) in a service usage mode, the address (ULADR) to which the generated image data is to be transmitted, and the like constitute data of a posting function embedded file.

<Program of Cellular Phone 100>

Figure 9:
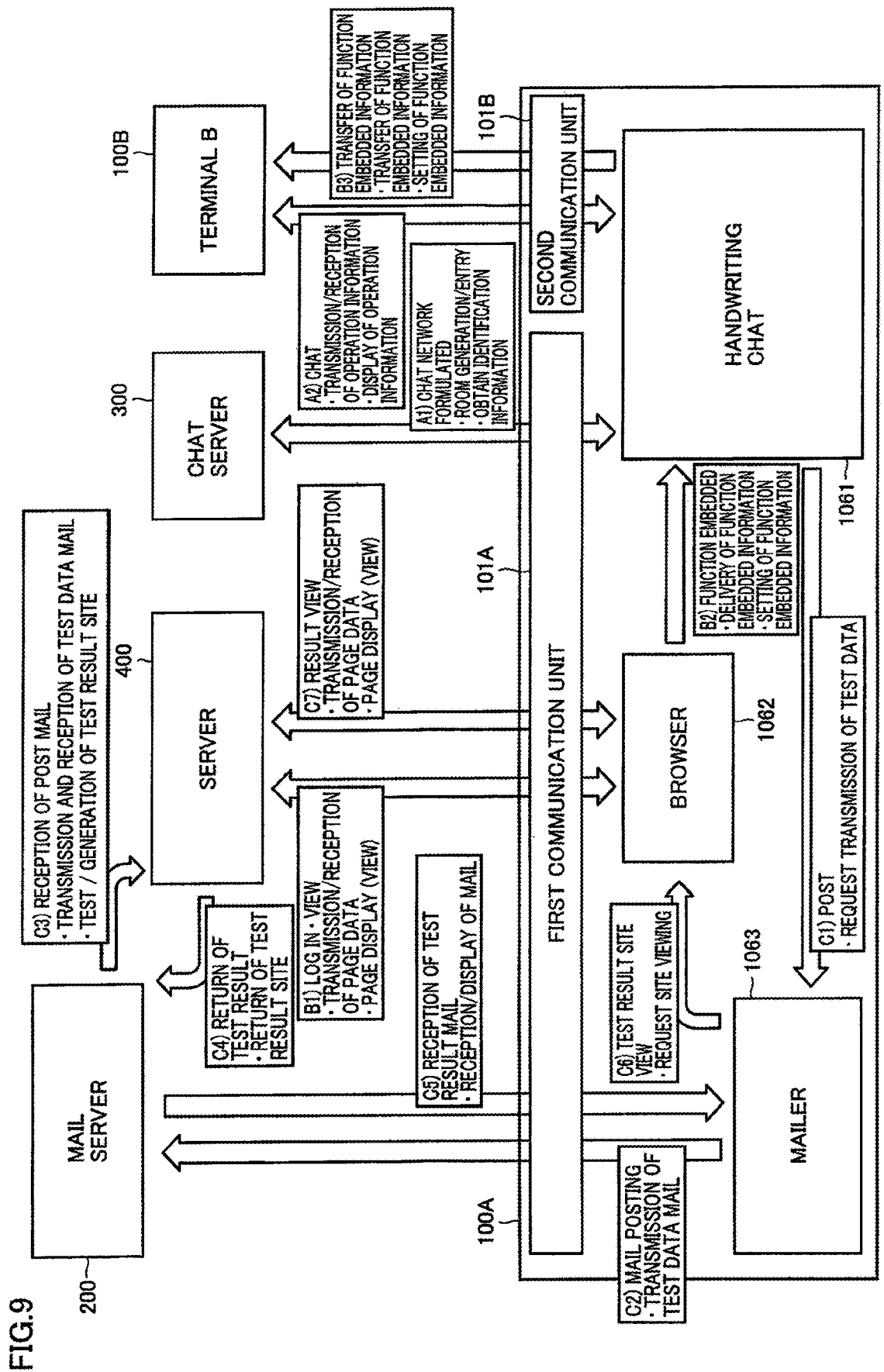
FIG. 9 is a pictorial representation of the relationship between programs executed by control units of cellular phones according to an embodiment.

The relationship between programs executed by control unit 110 in cellular phone 100 of the present embodiment will be described hereinafter. FIG. 9 is a pictorial representation indicating the relationship between programs executed by control unit 110 in cellular phone 100 of the present embodiment.

Referring to FIG. 9, control unit 110 of cellular phone 100 implements, based on a program loaded in volatile memory 103, a handwriting chat application 1061, a browser application 1062, and a mailer application 1063.

Communication device 101 and communication controller 108 of cellular phone 100 implement a first communication unit 101A and a second communication unit 101B. First communication unit 101A transmits/receives data to/from mail server 200, chat server 300, and posting server 400 via a carrier network, Internet, or the like. Second communication unit 101B transmits/receives data to/from another terminal (cellular phone) via a carrier network, Internet, or the like.

The operation (function) of each application implemented by control unit 110 will be described hereinafter in chronological order.

First, handwriting chat application 1061 transmits a chat network formulation request to chat server 300 via first communication unit 101A (A1). Specifically, handwriting chat application 1061 transmits to chat server 300 a room generation request and a room entry request. Handwriting chat application 1061 also obtains identification information from chat server 300.

Handwriting chat application 1061 conducts a chat communication with second cellular phone 100B via second communication unit 101B (A2). Specifically, handwriting chat application 1061 transmits the operation information accepted via tablet 102 to second cellular phone 100B via the second communication unit. Handwriting chat application 1061 receives the operation information from second cellar phone 100B via second communication unit 101B. Handwriting chat application 1061 displays the operation information accepted via tablet 102 at display 107. Handwriting chat application 1061 displays the operation information received from second cellular phone 100B via second communication unit 101B at display 107.

Browser application 1062 responds to an operation instruction from the user to log into posting server 400 and/or browse the data of posting server 400 (B1). Specifically, browser application 1062 receives page data from posting server 400 via first communication unit 101A. Browser application 1062 displays the page based on the page data received from posting server 400 at display 107.

Browser application 1062 delivers the function embedded information received from posting server 400 to handwriting chat application 1061 (B2). Further, handwriting chat application 1061 sets the delivered function embedded information (reset the chat application environment such as a display process of the underlying image included in the function embedded information).

Handwriting chat application 1061 transfers the function embedded information to another terminal via second communication unit 101B (B3). Specifically, handwriting chat application 1061 transfers the function embedded information received from posting server 400 to second cellular phone 100B currently participating in a chat communication. At (the handwriting chat application of) second cellular phone 100B, the transferred function embedded information is set (share the chat environment such as applying a display process on the underlying image included in the function embedded information).

Mailer application 1063 accepts a posting instruction of a handwriting image from handwriting chat application 1061 (C1). Specifically, mailer application 1063 receives a compatibility test data transmission request from handwriting chat application 1061.

Mailer application 1063 posts mail to mail server 200 via first communication unit 101A (C2). Specifically, mailer application 1063 transmits the compatibility test data mail via first communication unit 101A.

Meanwhile, mail server 200 receives the posted mail from first cellular phone 100A (C3). Specifically, mail server 200 receives the test data mail from first cellular phone 100A via network 500. Mail server 200 transmits the test data mail to posting server 400.

Posting server 400 executes a test process based on the test data mail. Posting server 400 returns the test result to mail server 200 (C4). Specifically, posting server 400 transmits to mail server 200 the address of a site to view the test result.

Mail server 200 receives the test result from posting server 400, and transmits the test result mail to first cellular phone 100A (C5). Namely, mailer application 1063 receives from mail server 200 the test result mail via first communication unit 101A.

Mailer application 1063 delivers the address of the site to view the test result to browser application 1062 (C6). Browser application 1062 displays the address of the site to view the test result at display 107 in a selectable manner Browser application 1062 accepts a viewing instruction from the user via tablet 102.

Browser application 1062 gains access to the site to view the test result based on the relevant address via first communication unit 101A (C7). Browser application 1062 receives page data of the site to view the test result from posting server 400 via first communication unit 101A. Browser application 1062 displays the test result based on the page data at display 107.

<Data Transmission/Reception Process>

Figure 10:
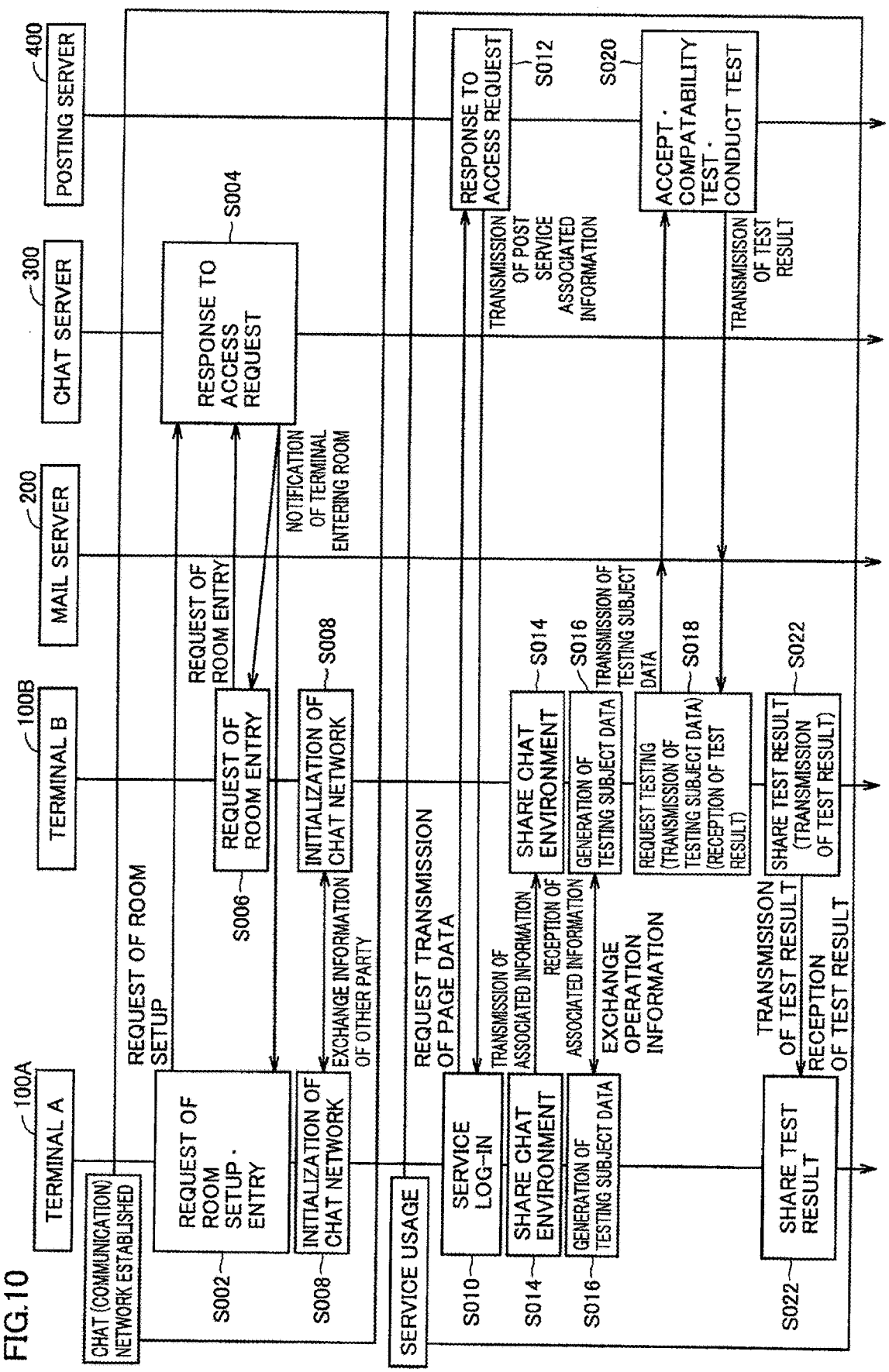
FIG. 10 represents the sequence of an overview of data transmission and reception process at a network system according to an embodiment.

An overview of a data transmission/reception process at network system 1 of the present embodiment will be described hereinafter. FIG. 10 represents the sequence of an overview of a data transmission/reception process at network system 1 of the present embodiment.

Referring to FIG. 10, first cellular phone 100A accepts a room setup request from the user to transmit a room setup request and room entry request to chat server 300 via the network (step S002). Chat server 300 accepts the room setup request and room entry request from the first cellular phone to respond to the relevant request (step S004).

Second cellular phone 100B accepts the room entry request from the user to transmit the room entry request to chat server 300 via network 500 (step S006). Chat server 300 receives a room entry request from second cellular phone 100B and responds to the access request. Chat server 300 transmits the identification information of second cellular phone 100B that is the entry terminal to first cellular phone 100A via network 500. At the same time, chat server 300 transmits to second cellular phone 100B the identification information of first cellular phone 100A that is the room entry terminal. First cellular phone 100A and second cellular phone 100B initialize the chat network via a carrier network or the like (step S008).

An overview of the data transmission/reception process in a service usage mode will be described hereinafter. First cellular phone 100A carries out a log-in process to the service according to a request from the user (step S010). Specifically, first cellular phone 100A gains access to the contributor page of posting server 400. In other words, first cellular phone 100A requests posting server 400 of page data transmission.

Posting server 400 responds to the access request according to the page data transmission request from first cellular phone 100A (step S012). Specifically, posting server 400 transmits the posting service related information (function embedded information) to first cellular phone 100A.

First cellular phone 100A and second cellular phone 100B share the chat environment via a chat network or the like based on the identification information of each other (step S014). More specifically, first cellular phone 100A transmits the posting service related information (function embedded information) to second cellular phone 100B.

First cellular phone 100A and second cellular phone 100B generate testing subject data (step S016). Specifically, first cellular phone 100A and second cellular phone 100B exchange the handwriting instruction (handwriting image) accepted via tablet 102. First cellular phone 100A and second cellular phone 100B sequentially display the handwriting information at display 107.

Second cellular phone 100B requests mail server 200 of a test according to the test instruction from the user (step S018). Specifically, second cellular phone 100B transmits testing subject data (handwriting image) to mail server 200. Mail server 200 transfers the testing subject data received from second cellular phone 100B to posting server 400.

Posting server 400 executes a subject test process based on the testing subject data received from second cellular phone 100B via mail server 200 (step S020). Posting server 400 transmits the test result to mail server 200. Mail server 200 transmits the test result mail to second cellular phone 100B based on the test result from posting server 400. Second cellular phone 100B receives the test result mail from mail server 200.

First cellular phone 100A and second cellular phone 100B share the test result (step S022). Specifically, second cellular phone 100B transmits the test result to first cellular phone 100A based on the means result received from posting server 400 via mail server 200. Specifically, mail server 200 transmits the address of the site to view the test result to second cellular phone 100B. The second cellular phone transmits data including the relevant address to first cellular phone 100A. The users of first cellular phone 100A and second cellular phone 100B can view the test result by gaining access to the site for viewing the test result based on the relevant address.

<Activation Process>

Figure 11:
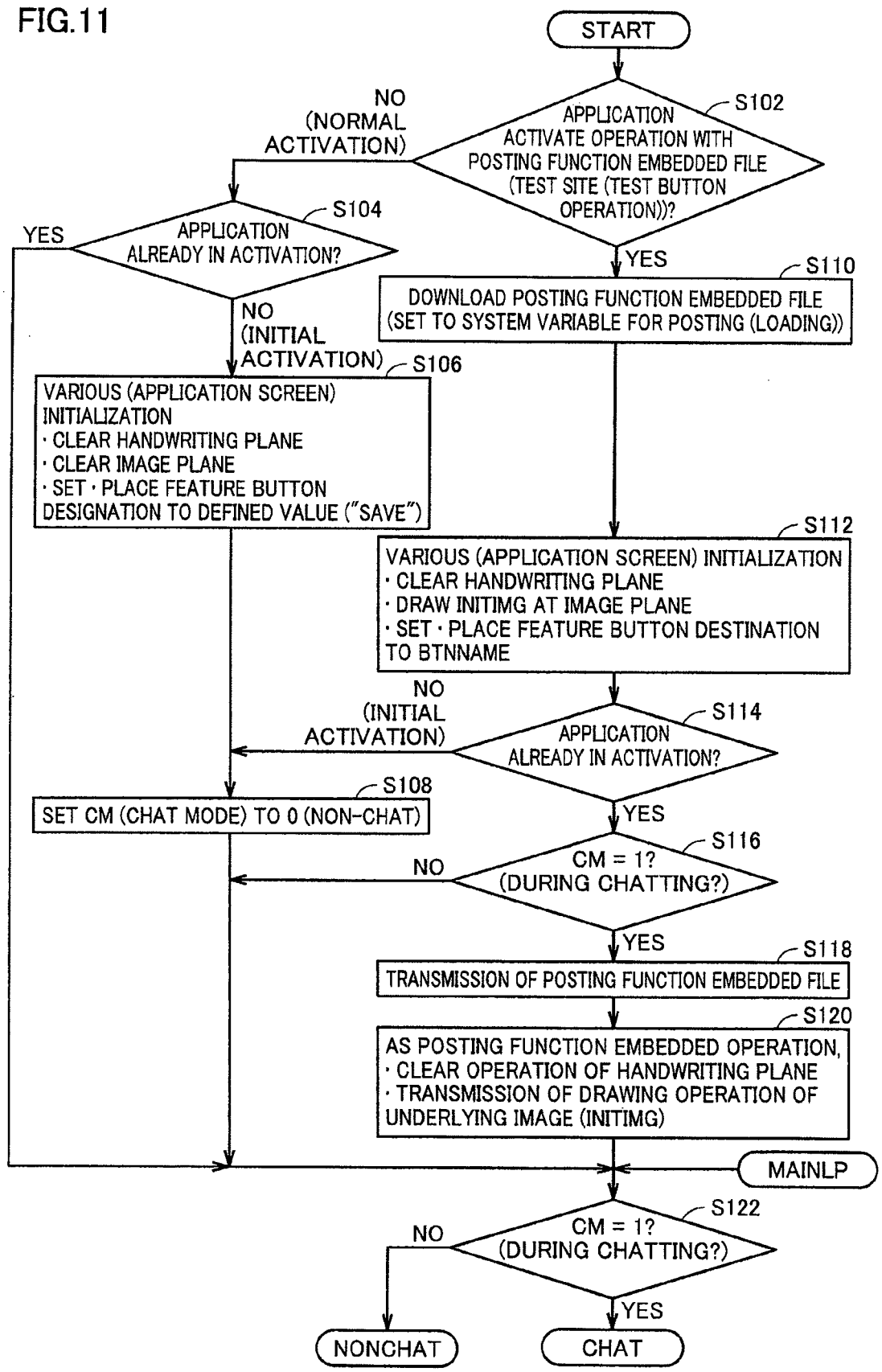
FIG. 11 is a flowchart of the procedure of an activation process at a cellular phone according to an embodiment.

The procedure of an activation process at cellular phone 100 (first cellular phone 100A or second cellular phone 100B) according to the present embodiment will be described hereinafter. FIG. 11 is a flowchart of the procedure of an activation process at cellular phone 100 according to the present embodiment.

Referring to FIG. 11, upon the user carrying out a handwriting chat activation operation, control unit 110 of cellular phone 100 determines whether it is an application activation operation by a function embedded file (step S102). When not the activation operation of an application by the posting function embedded file (NO at step S102), control unit 110 determines whether the application is already in activation or not (step S104).

When the application is already in activation (YES at step S104), control unit 110 executes the process from step S122.

When the application is not yet activated (NO at step S104), control unit 110 initializes various data (step S106). For example, control unit 110 clears the memory region of the handwriting plane. For example, control unit 110 clears the memory region of the image plane. For example, control unit 110 sets or places the designation of a feature button corresponding to a defined value.

Control unit 110 sets the CM (chat mode) to 0 (non-chat) (step S108). Control unit 110 executes the process from step S122.

In an application activation operation by the posting function embedded file (YES at step S102), control unit 110 downloads the posting function embedded file from posting server 400 via communication device 101 (step S110). Specifically, control unit 110 sets various values to the system variables directed to posting. For example, control unit 110 stores in volatile memory 103 an underlying image (INITIMG), the designation of a posting feature button (BTNNAME), and the mail address of the post destination (SENDADR) as the system variables set by the posting function embedded file.

Control unit 110 initializes the variables related to the screen presented by the application (step S112). For example, control unit 110 clears the memory region of the handwriting plane. For example, control unit 110 writes INTIMG to the image plane. For example, control unit 110 sets or places the designation of a feature button to the value of BTNNAME.

Control unit 110 determines whether the application is already activated or not (step S114). When the application is not yet activated (NO at step S114), control unit 110 repeats the process from step S108.

When the application is already activated (YES at step S114), control unit 110 determines whether CM=1 or not (step S116). When not CM=1 (NO at step S116), control unit 110 repeats the process from step S122.

When CM=1 is established (YES at step S116), control unit 110 transmits the posting function embedded file to another terminal via communication device 101 (step S118). Control unit 110 transmits a clear operation of the handwriting plane and a drawing operation of the underlying image (INITIMG) as the posting function embedded operation to the relevant another terminal via communication device 101 (step S120).

Control unit 110 determines whether CM=1 is established or not (step S122). Specifically, control unit 110 determines whether currently engaged in a chat with another terminal. When cellular phone 100 is currently engaged in a chat with another terminal (YES at step S122), control unit 110 executes a chat process. The chat process will be described afterwards.

When cellular phone 100 is not currently engaged in a chat with another terminal (NO at step S122), control unit 110 executes a non-chat process (unitary usage process). The non-chat process will be described afterwards.

<Chat Process>

Figure 12:
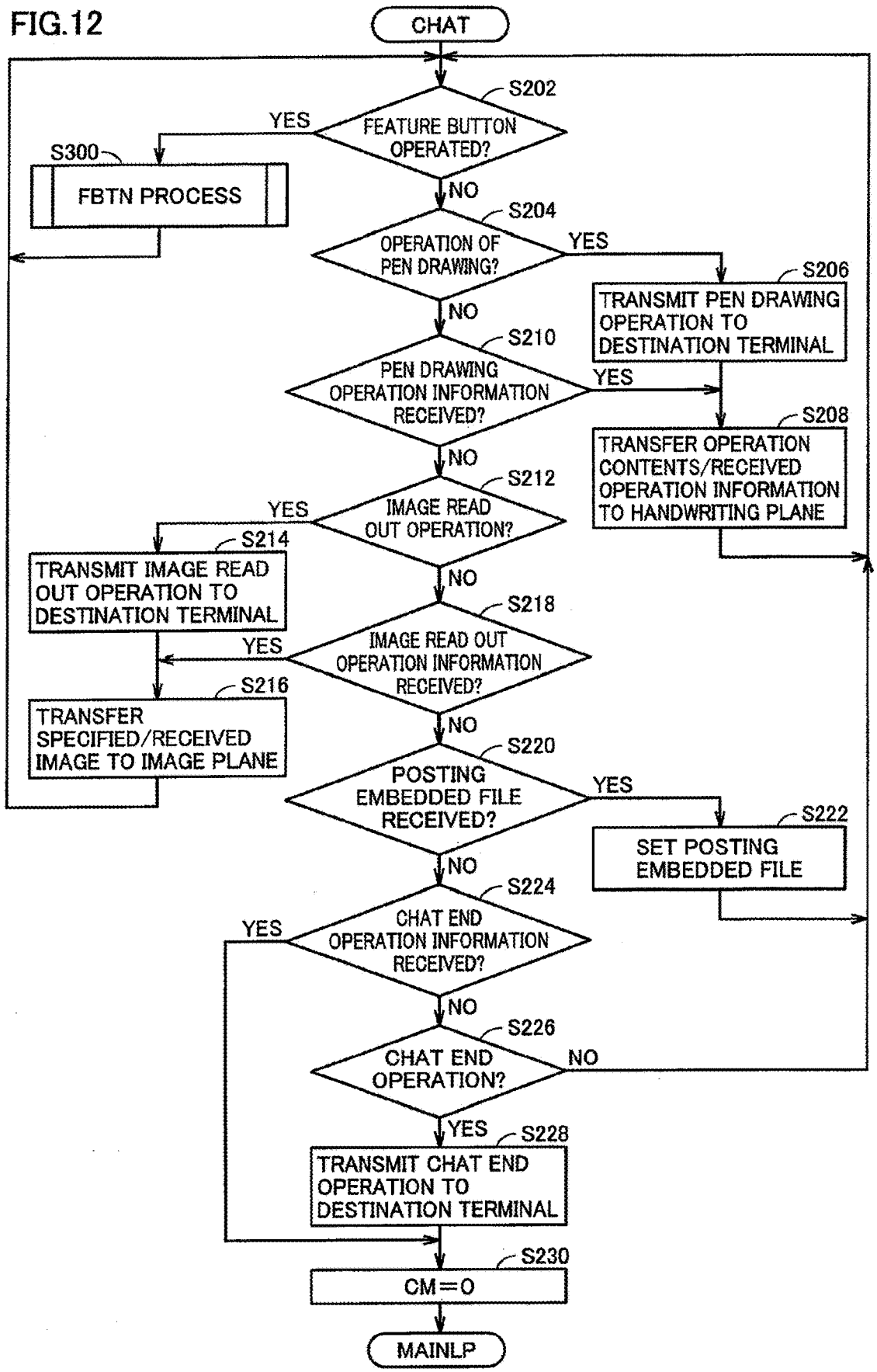
FIG. 12 is a flowchart of the procedure of a chat process at a cellular phone according to an embodiment.

The procedure of a chat process at cellular phone 100 (first cellular phone 100A or second cellular phone 100B) according to the present embodiment will be described hereinafter. FIG. 12 is a flowchart of the procedure of a chat process at cellular phone 100 according to the present embodiment.

Referring to FIG. 12, control unit 110 determines whether a feature button is operated or not (step S202). When the feature button is operated (YES at step S202), control unit 110 executes a feature button operation process subroutine (step S302) that will be described afterwards, and repeats the process from step S202.

When the feature button is not operated (NO at step S202), control unit 110 determines whether a pen drawing operation is accepted or not (step S204). When the pen drawing operation is accepted (YES at step S204), control unit 110 transmits via communication device 101 the pen drawing operation to the terminal of the other party (step S206). Control unit 110 transfers the operation contents to the handwriting plane (step S208). Control unit 110 repeats the process from step S202.

When the pen drawing operation is not accepted (NO at step S204), control unit 110 determines whether pen drawing operation information is received via communication device 101 (step S210). When the pen drawing operation information is received (YES at step S210), control unit 110 transfers the received operation information to the handwriting plane (step S208). Control unit 110 repeats the process from step S202.

When the pen drawing operation information is not received (NO at step S210), control unit 110 determines whether an image read operation is accepted or not (step S212). When the image read operation is accepted (YES at step S212), control unit 110 transmits the accepted image read operation to the terminal of the other party via communication device 101 (step S214). Control unit 110 transfers the accepted image read operation to the image plane (step S216). Control unit 110 repeats the process from step S202.

When the image read operation is not accepted (NO at step S212), control unit 110 determines whether image read operation information is received via communication device 101 (step S218). When the image read operation information is received (YES at step S218), control unit 110 transfers the received image into the image plane (step S216). Control unit 110 repeats the process from step S202.

When the image read operation information is not received (NO at step S218), control unit 110 determines whether a posting embedded file is received or not via communication device 101 (step S220). When the posting embedded file is received via the communication device (YES at step S220), control unit 110 sets the posting embedded file in volatile memory 103 (step S222).

Specifically, in comparison with step S110 described above, the underlying image (INITIMG), the post feature button designation (BTNNAME), and the mail address of the post destination (SENDADR), differing in that they correspond to a posting function embedded file transmitted by the process of step S118 of the chat party, not from posting server 400, are stored in volatile memory 103. Furthermore, the designation of the feature button is set or placed at the value of the BTNNAME, equivalent to a portion of the process of step S112 set forth above. It is to be noted that clearing the memory region of the handwriting plane and drawing INITIMG into the image plane performed at step S112 can be omitted since they will be processed at step S208 and step S216 according to the process of step S120 of the chat party. Control unit 110 executes the process from step S202.

When the posting embedded file is not received via communication device 101 (NO at step S220), control unit 110 determines whether chat end operation information is received or not (step S224). When the chat end operation information is received via communication device 101 (YES at step S224), control unit 110 executes the step from step S230.

When the chat end operation information is not received via communication device 101 (NO at step S224), control unit 110 determines whether a chat end operation is received or not (step S226). When the chat end operation is not accepted (NO at step S226), control unit 110 repeats the process from step S202.

When the chat end operation is accepted (YES at step S226), control unit 110 transmits the relevant chat end operation to the terminal of the other party via communication device 101 (step S228). Control unit 110 enters 0 into the variable CM of the volatile memory (step S230). Control unit 110 ends the chat process.

<Non-Chat Process>

Figure 13:
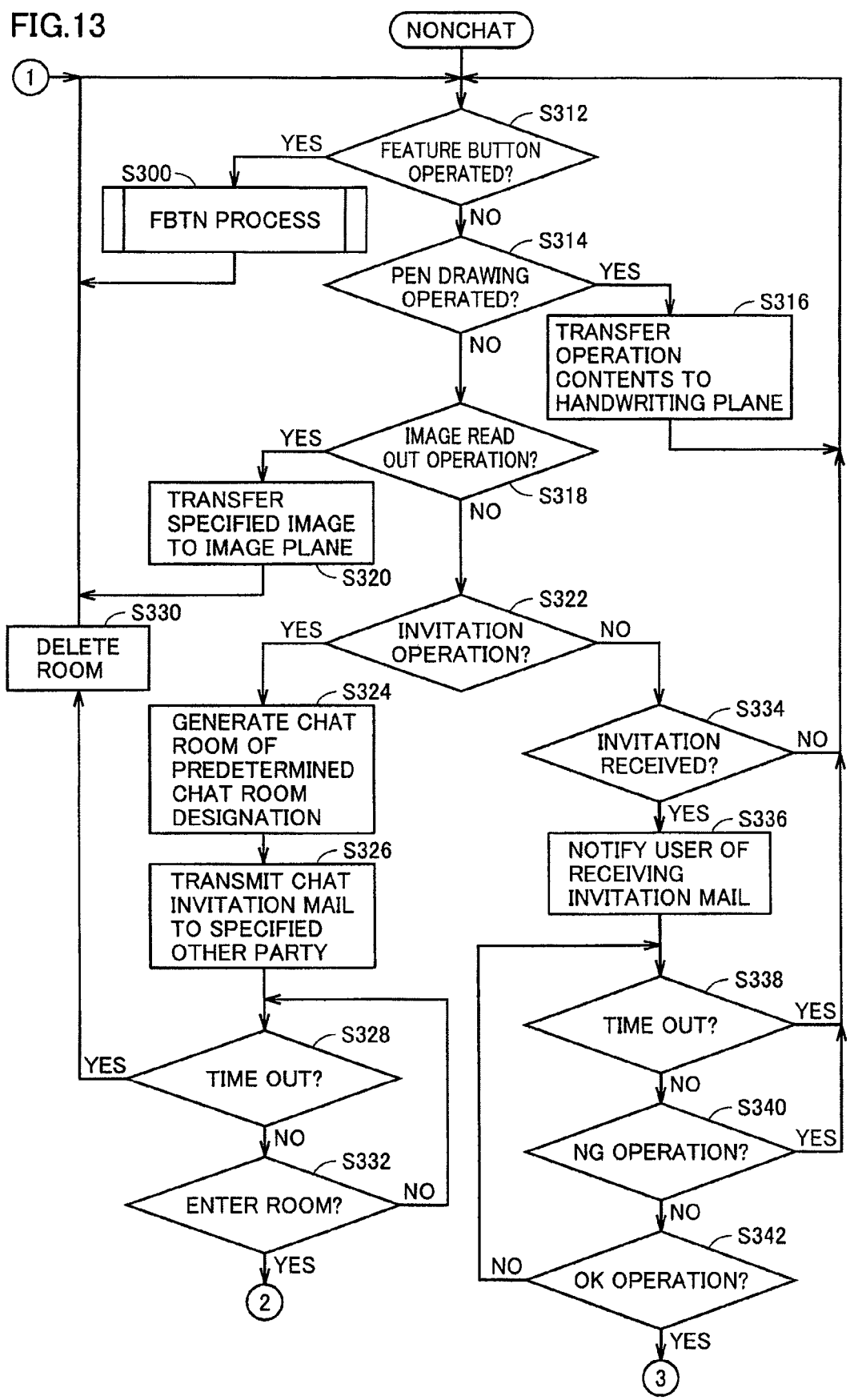
FIG. 13 is a first flowchart of the procedure of a non-chat process according to an embodiment.
Figure 14:
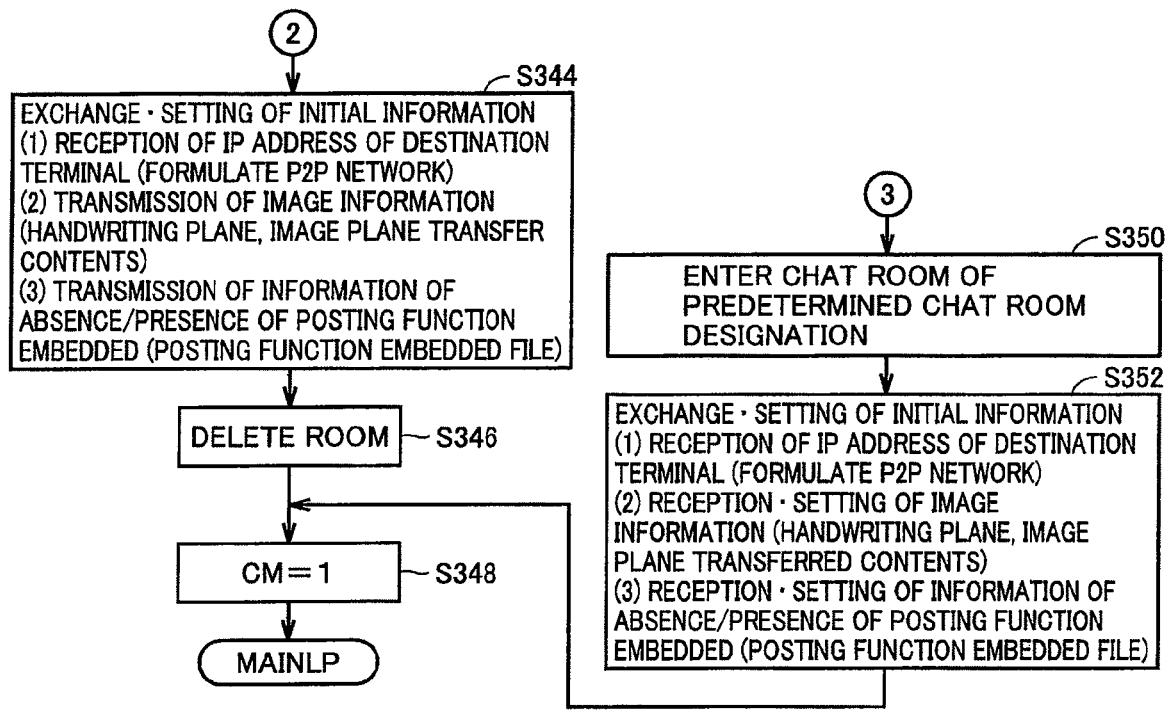
FIG. 14 is a second flowchart of the procedure of a non-chat according to an embodiment.

A non-chat process (unitary usage process) at cellular phone 100 (first cellular phone 100A or second cellular phone 100B) according to the present embodiment will be described hereinafter. FIG. 13 is a first flowchart of the procedure of a non-chat process at cellular phone 100 according to the present embodiment. FIG. 14 is a second flowchart of the procedure of a non-chat process at cellular phone 100 according to the present embodiment.

Referring to FIG. 13, control unit 110 determines whether a feature button is operated or not (step S312). When the feature button is operated (YES at step S312), control unit 110 executes the feature button operation process subroutine (step S300, specifically step S302) that will be described afterwards, and repeats the process from step S312.

When the feature button is not operated (NO at step S312), control unit 110 determines whether a pen drawing operation is accepted or not (step S314). When the pen drawing operation is accepted (YES at step S314), control unit 110 transfers the accepted operation contents to the handwriting plane (step S316). Control unit 110 repeats the process from step S312.

When the pen drawing operation is not accepted (NO at step S314), control unit 110 determines whether an image read operation is accepted or not (step S318). When the image read operation is accepted (YES at step S318), control unit 110 transfers the specified image to the image plane (step S320). Control unit 110 repeats the process from step S312.

When the image read operation is not accepted (NO at step S318), control unit 110 determines whether an invitation operation is accepted or not (step S322). When the invitation operation is accepted (YES at step S322), control unit 110 transmits a request to chat server 300 via communication device 101 for generating the chat room of the predetermined chat room name (step S324).

Control unit 110 transmits mail inviting to have a chat to the specified party via communication device 101 (step S326). Control unit 110 determines whether a predetermined time has elapsed from transmitting mail inviting to have a chat (step S328). When the predetermined time has elapsed from transmitting mail inviting to have a chat (YES at step S328), control unit 110 transmits a chat room delete instruction to chat server 300 (step S330). Control unit 110 repeats the process from step S312.

When the predetermined time has not elapsed from transmitting mail inviting to have a chat (NO at step S328), control unit 110 determines whether the specified party has entered the chat room (step S332). When the specified party has not entered the chat room (NO at step S332), control unit 110 repeats the step from step S328. When the specified party has entered the chat room (YES at step S332), the process from step S344 is executed.

When the invitation operation is not accepted (NO at step S322), control unit 110 determines whether an invitation message has been received from another terminal via communication device 101 (step S334). When the invitation message from another terminal is not received (NO at step S334), control unit 110 repeats the process from step S312.

When the invitation message from another terminal is received (YES at step S334), control unit 110 notifies the user of receiving an invitation mail (step S336). Control unit 110 determines whether a predetermined time has elapsed from notifying the user of receiving the invitation mail (step S338). When the predetermined time has elapsed (YES at step S338), control unit 110 repeats the process from step S312.

When the predetermined time has not elapsed (NO at step S338), control unit 110 determines whether an NG operation is received or not (step S340). When the NG operation is received from the user (YES at step S340), control unit 110 repeats the process from step S312.

When the NG operation is not accepted (NO at step S340), control unit 110 determines whether an OK operation is accepted from the user (step S342). When the OK operation is not accepted from the user (NO at step S342), control unit 110 repeats the process from step S338. When the OK operation is accepted from the user (YES at step S342), control unit 110 repeats the process from step S350.

Referring to FIG. 14, when the specified party has entered the chat room (YES at step S332 in FIG. 13), control unit 110 exchanges or sets initial information with the terminal of the other party via communication device 101 (step S344). Specifically, control unit 110 receives the IP address of the terminal of the other party via communication device 101. Control unit 110 transmits image information (contents transferred to handwriting plane, image plane) via communication device 101. Control unit 110 transmits information such as the presence/absence of posting function embedded (posting function embedded file) via communication device 101.

Control unit 110 transmits a request to delete the chat room to chat server 300 via communication device 101 (step S346). Control unit 110 inserts 1 into variable CM of the volatile memory (step S348). Control unit 110 ends the non-chat process.

When the OK operation is accepted from the user (YES at step S342 in FIG. 13), control unit 110 enters the chat room corresponding to a predetermined chat room name of chat server 300 via communication device 101 (step S350).

Control unit 110 exchanges and/or sets the initial information with the terminal of the other party via communication device 101 (step S352). Specifically, control unit 110 receives the IP address of the terminal of the other party via communication device 101. Control unit 110 receives and sets the image information (contents transferred to handwriting plane, image plane) via communication device 101. Control unit 110 receives and/or sets information such as the presence/absence of posting function embedded (posting function embedded file) via communication device 101. Control unit 110 executes the process from step S348.

<Feature Button Operation Process>

Figure 15:
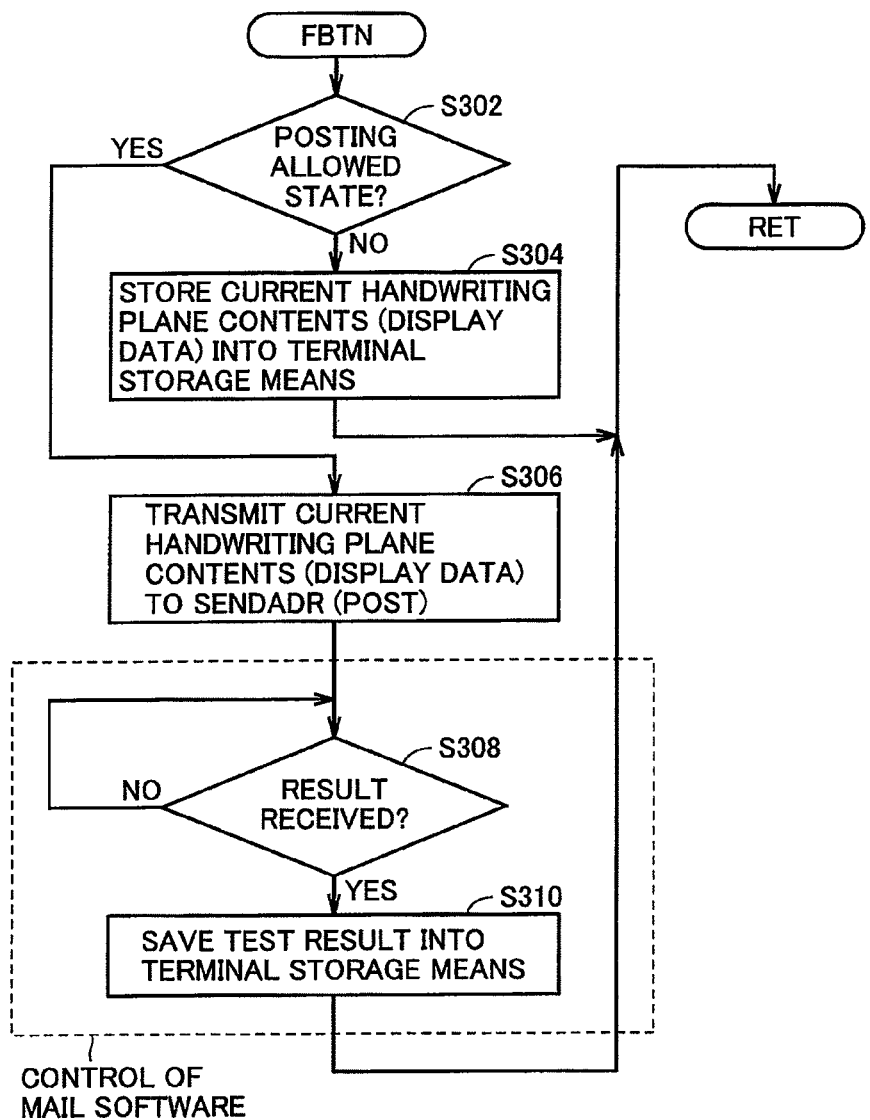
FIG. 15 is a flowchart of the procedure of a feature button operation process subroutine according to an embodiment.

The procedure of the feature button process (process when feature button is depressed) subroutine at cellular phone 100 (first cellular phone 100A or second cellular phone 100B) according to the present embodiment will be described hereinafter. FIG. 15 is a flowchart of the procedure of a feature button operation process subroutine of the present embodiment.

Referring to FIG. 15, control unit 110 determines whether in a posting allowed state or not (step S302). Specifically, control unit 110 determines whether SENDADR of the volatile memory is not NULL. When not in a posting allowed state (NO at step S302), control unit 110 stores the contents of the handwriting plane (display data) into volatile memory 103 or non-volatile memory 105 (step S304). Control unit 110 executes the process from step S312.

When in a posting allowed state (YES at step S302), the contents of the handwriting plane (display data) is transmitted according to SENDADR via communication device 101 (step S306). Control unit 110 determines whether a test result is received from posting server 400 via communication device 101 (step S308). When the test result is not received (NO at step S308), control unit 110 repeats the process from step S308.

When the test result is received (YES at step S308), control unit 110 stores the relevant test result in volatile memory 103 or non-volatile memory 105 (step S310). Control unit 110 returns the control to the execution destination of the main subroutine.

<PBPUSH Process>

Figure 16:
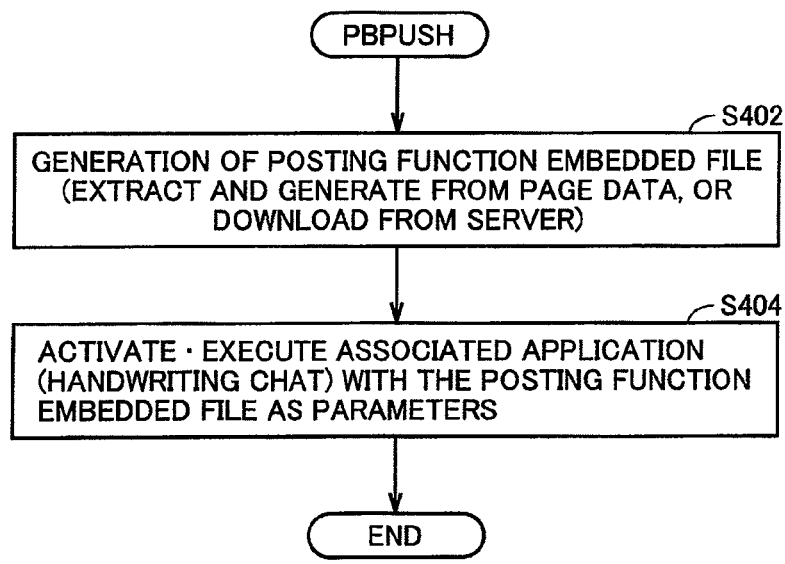
FIG. 16 is a flowchart of the procedure of a service usage start button operation process according to an embodiment.

The procedure of a service usage start button operation process (PBPUSH process) at cellular phone 100 according to the present embodiment will be described hereinafter. FIG. 16 is a flowchart of the procedure of a PBPUSH process at cellular phone 100 of the present embodiment.

Referring to FIG. 16, control unit 110 generates a posting function embedded file (step S402). Specifically, control unit 110 extracts the posting function embedded file based on page data. Alternatively, control unit 110 downloads the posting function embedded file from posting server 400.

Control unit 110 activates and executes an application associated with the relevant file (handwriting chat application) with the posting function embedded file as the parameters (step S404). More specifically, a browser application and the handwriting application are linked as set forth below in the present embodiment. In other words, the browser application activates the handwriting application.

(1) Activation of a handwriting chat application is conducted by an OS (operation system) function. As used herein, the OS function is directed to executing an application associated with a specified file based on associated information between a file extension and the application (execution file), registered in a registry (system file).

(2) The correspondence (association) between the file extension and the application is registered in the registry at the time of installing the handwriting chat application.

(3) The setting of the system variables of the application is conducted by the activation process on part of the application (activation process of the handwriting chat application). For example, control unit 110 sets the contents of the file indicated by a variable DLDT in the posting function embedded file at handwriting chat variable INITIMG. Control unit 110 sets the value of a variable ULADR in the posting function embedded file at handwriting chat variable SENTADR.

<Service Process>

Figure 17:
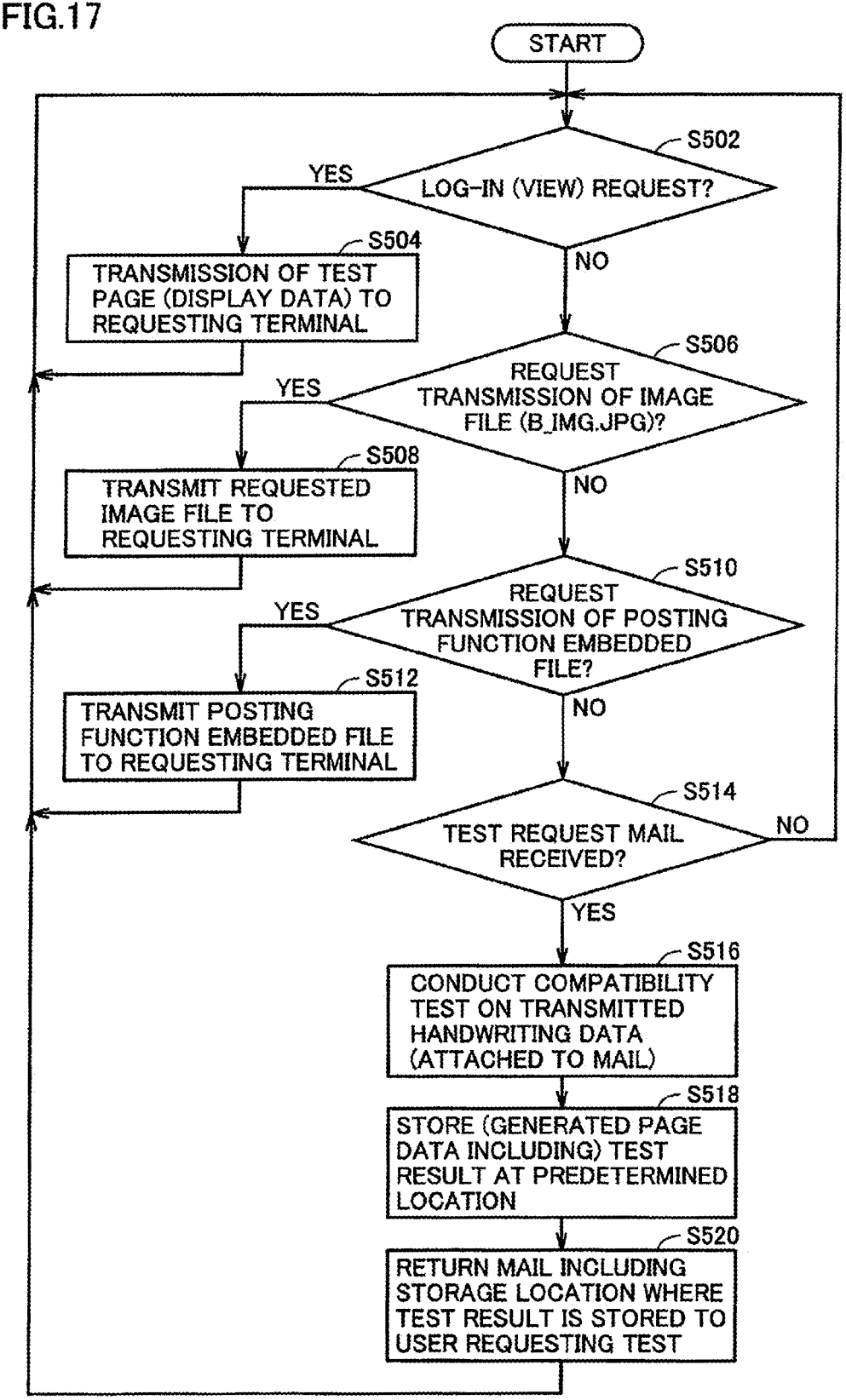
FIG. 17 is a flowchart of the procedure of a service process at a posting server according to an embodiment.

The procedure of a service process at posting server 400 of the present embodiment will be described hereinafter. FIG. 17 is a flowchart of the procedure of the service process at posting server 400 of the present embodiment.

Referring to FIG. 17, control unit 410 determines whether a log-in request is accepted from cellular phone 100 via communication device 401 (step S502). When the log-in request is accepted from cellular phone 100 (YES at step S502), control unit 410 transmits the display data of a compatibility test page to the relevant cellular phone via communication device 401 (step S504). Control unit 410 repeats the process from step S502.

When the log-in request is not accepted from cellular phone 100 (NO at step S502), control unit 410 determines whether an image file (B_IMG.JPG) transmission request is accepted via communication device 401 (step S506). When the image file transmission request is accepted (YES at step S506), control unit 410 transmits the requested image file to the terminal issuing the request via communication device 401 (step S508). Control unit 410 repeats the process from step S502.

When the image file transmission request is not accepted (NO at step S506), control unit 410 determines whether a function embedded file transmission request is accepted from cellular phone 100 (step S510). When the request for transmitting a function embedded file is accepted from cellular phone 100 (YES at step S510), control unit 410 transmits the posting function embedded file to the terminal issuing the request via communication device 401 (step S512). Control unit 410 repeats the process from step S502.

When the request for transmitting a function embedded file is not accepted (NO at step S510), control unit 410 determines whether a test request mail is received via communication device 401 (step S514). When the test request mail is not received from the cellular phone (NO at step S514), control unit 410 repeats the process from step S502.

When the test request mail is received (YES at step S514), control unit 410 carries out a compatibility test process based on the transmitted handwriting data (step S516). Control unit 410 stores the processed result of the test process at a predetermined location in volatile memory 403 or non-volatile memory 405 (step S518).

Control unit 410 returns the mail including the stored location (address of the site for viewing the test result) to the terminal issuing the test request via communication device 401 (step S520). Control unit 410 repeats the process from step S502.

Other Embodiments

The present invention is also applicable in the case where a program is supplied to a system or device. The advantage of the present invention can be offered by supplying a storage medium in which is recorded a program represented by software directed to accomplishing the present invention to a system or device, and causing the computer of that system or device to read out and execute the program code stored in the storage device.

In this case, the program code per se read out from the storage medium implements the function of the embodiments set forth above. The storage medium storing such program codes constitute the present invention.

For a storage medium to supply the program code, a hard disk, optical disk, magneto optical disk, CD-ROM, CD-R, magnetic tape, non-volatile memory card (IC memory card), ROM (mask ROM, flash EEPROM and the like) may be used.

In addition to realizing the functions of the embodiments set forth above by executing a program code read out by a computer, the functions of the embodiments described above may be realized by a process according to an OS (Operating System) running on the computer performing a part of or all of the actual process, based on the commands of the relevant program codes.

Further, the program codes read out from a recording medium may be written to a memory included in a functionality expansion board inserted to a computer or a functionality expansion unit connected to a computer. Then, the functions of the embodiments described above may be realized by a process according to a CPU or the like provided on the functionality expansion board or the functionality expansion unit, performing a part of or all of the actual process, based on the commands of the relevant program codes.

It is to be understood that the embodiments disclosed herein are only by way of example, and not to be taken by way of limitation. The scope of the present invention is not limited by the description above, but rather by the terms of the appended claims, and is intended to include any modifications within the scope and meaning equivalent to the terms of the claims.

REFERENCE SIGNS LIST

1 network system; 100 cellular phone; 100A first cellular phone; 100B second cellular phone; 101, 101A, 101B communication device; 102 tablet; 103 volatile memory; 104 display memory; 104A initial image; 105 non-volatile memory; 106 main controller; 107 display; 108 communication controller; 109 display controller; 110 control unit; 200 mail server; 300 chat server; 400 posting server; 401 communication device; 403 volatile memory; 405 non-volatile memory; 406 main controller; 410 control unit; 500 network; 1061 chat application; 1062 browser application; 1063 mailer application.

The invention claimed is:

1. A communication method of using a communication terminal to communicate to a server and another apparatus via a network, the method comprising:
   carrying out a log-in process to said server by said communication terminal;
   accepting an operation instruction by said communication terminal;
   requesting said server of contents according to said operation instruction by said communication terminal;
   receiving said contents from said network according to said request from said communication terminal, by said communication terminal;
   causing a first display to show said contents by said communication terminal;
   determining whether connection with said another apparatus is established or not by said communication terminal;
   transmitting said contents to said another apparatus after a determination is made that connection with said another apparatus is established by said communication terminal;
   receiving said contents from said communication terminal by said another apparatus; and
   changing said contents by said another apparatus so as to transmit to mail server.

2. The communication method according to claim 1, further comprising:
   causing a second display to show said contents by said another apparatus.

3. The communication method according to claim 2, further comprising:

converting said contents to a format acceptable by said another apparatus, wherein:
> said transmitting said contents includes transmitting said converted contents;
> said receiving said contents includes receiving said converted contents; and
> causing said second display to show said contents includes causing said second display to show said converted contents.

4. The communication method according to claim 1, wherein:
> said requesting said server of contents includes requesting said sever of contents via a wireless communication device, and
> said transmitting said contents to said another apparatus includes transmitting said contents via said wireless communication device.

5. The communication method according to claim 1, wherein:
> said requesting is performed via a communication device; and
> said receiving is performed via a wireless communication device.

6. The communication method according to claim 1, wherein:
> said requesting is performed via a first wireless communication device; and
> said receiving is performed via a second wireless communication device.

7. The communication method according to claim 1, wherein said contents is an image.

8. The communication method according to claim 1, wherein said contents is a Web page.

* * * * *